US012743596B2

(12) United States Patent
Smith et al.

(10) Patent No.: US 12,743,596 B2
(45) Date of Patent: Sep. 22, 2026

(54) COMPUTING DEVICE RACK LOCATION IDENTIFICATION SYSTEM

(71) Applicant: Dell Products L.P., Round Rock, TX (US)

(72) Inventors: Erik P. Smith, Douglas, MA (US); Padmanabhan Narayanan, Chennai (IN); Neal Beard, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/920,924

(22) Filed: Oct. 20, 2024

(65) Prior Publication Data

US 2026/0111691 A1 Apr. 23, 2026

(51) Int. Cl.
*G06F 19/00* (2018.01)
*G06K 7/10* (2006.01)

(52) U.S. Cl.
CPC .................... *G06K 7/10861* (2013.01); *G06K 2007/10504* (2013.01)

(58) Field of Classification Search
CPC ............... G06Q 10/10; G06K 7/10861; G06K 17/0029; G06K 2007/10504
USPC .................................................. 235/385, 380
See application file for complete search history.

(56) References Cited

U.S. PATENT DOCUMENTS

| | | | | |
|---|---|---|---|---|
| 8,264,354 | B2 * | 9/2012 | Groth | G08B 21/182 705/28 |
| 9,489,399 | B1 * | 11/2016 | Laporte | G06F 16/20 |
| 9,943,960 | B2 * | 4/2018 | Morrill | B25J 9/1666 |
| 11,798,156 | B2 * | 10/2023 | Gaikwad | G06K 19/06028 |
| 2009/0019201 | A1 * | 1/2009 | Chainer | H04L 41/12 710/107 |
| 2016/0275351 | A1 * | 9/2016 | Cattoen | G06Q 10/06 |
| 2017/0033839 | A1 * | 2/2017 | Abbondanzio | H04W 4/80 |
| 2017/0085413 | A1 * | 3/2017 | Cencini | G06F 1/206 |
| 2018/0262722 | A1 * | 9/2018 | Li | H04N 7/185 |
| 2019/0053397 | A1 * | 2/2019 | Larson | H05K 7/1498 |
| 2023/0114730 | A1 * | 4/2023 | Sprenger | G06F 11/3006 165/11.1 |
| 2023/0273618 | A1 * | 8/2023 | Thode | B66F 9/20 701/25 |
| 2024/0070611 | A1 * | 2/2024 | Thibaut | G06T 7/73 |

* cited by examiner

*Primary Examiner* — Daniel St Cyr
(74) *Attorney, Agent, or Firm* — Joseph Mencher

(57) ABSTRACT

A computing device rack location identification system includes a rack defining computing device housings and including respective rack location identifier(s) adjacent each of the computing device housings. A computing device may be positioned in any of the computing device housings, and a camera device in the computing device may capture an image of one of the respective rack location identifier(s) located adjacent that computing device housing. A computing device rack location reporting subsystem in the computing device receives the image captured by the camera device, and transmits image information associated with the image via a network to a computing device rack location tracking system.

20 Claims, 37 Drawing Sheets

1300

COMPUTING DEVICE POSITIONED IN COMPUTING DEVICE HOUSING IN RACK THAT INCLUDES RESPECTIVE RACK LOCATION IDENTIFIER(S) LOCATED ADJACENT COMPUTING DEVICE HOUSING
1302
CAMERA DEVICE IN COMPUTING DEVICE CAPTURES IMAGE OF RACK LOCATION IDENTIFIER LOCATED ADJACENT COMPUTING DEVICE HOUSING
1304
COMPUTING DEVICE RACK LOCATION REPORTING SUBSYSTEM IN COMPUTING DEVICE RECEIVES IMAGE OF RACK LOCATION IDENTIFIER CAPTURED BY CAMERA DEVICE
1306
COMPUTING DEVICE RACK LOCATION REPORTING SUBSYSTEM TRANSMITS IMAGE INFORMATION ASSOCIATED WITH IMAGE VIA A NETWORK TO COMPUTING DEVICE RACK LOCATION TRACKING SUBSYSTEM
1308

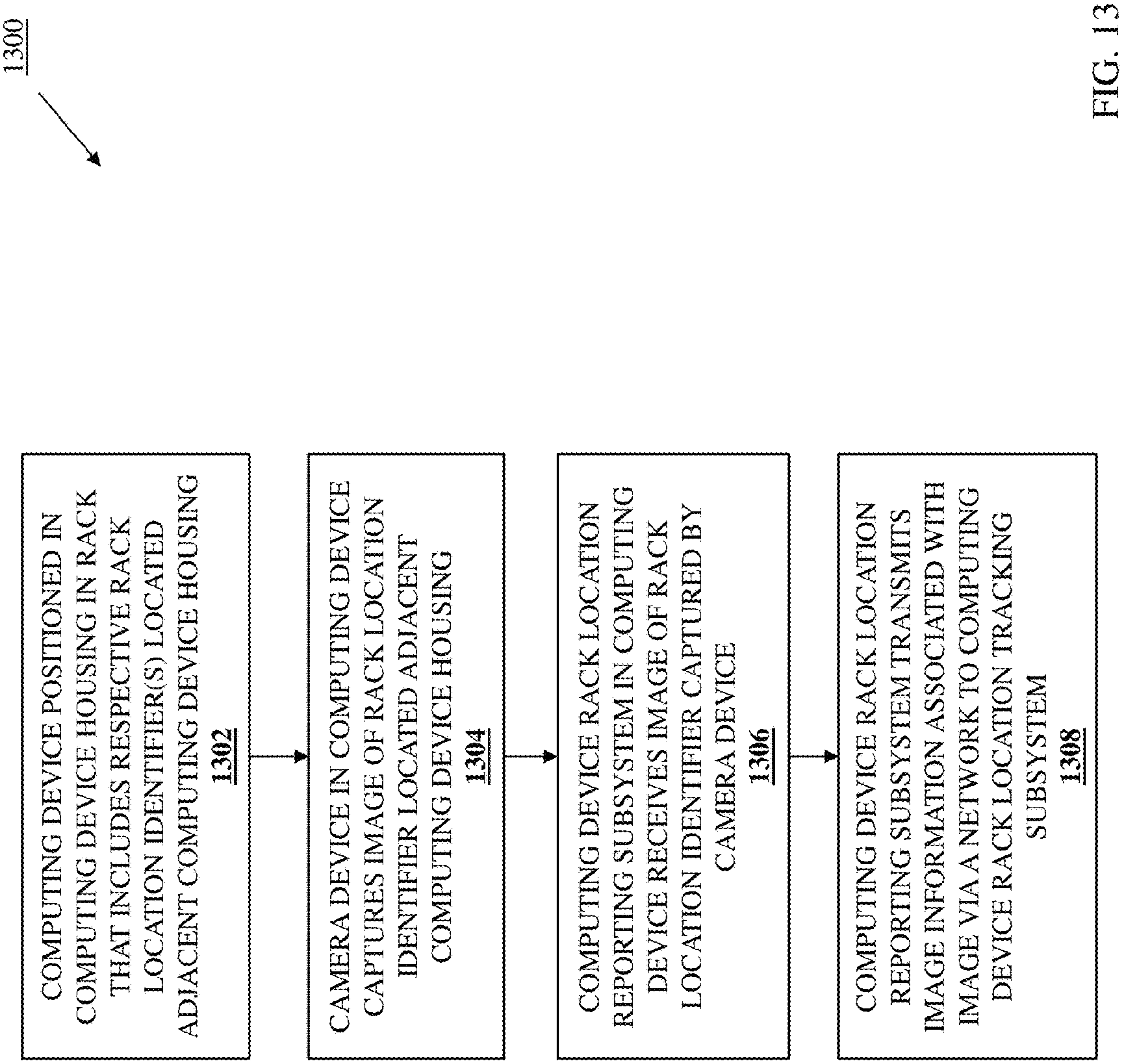

FIG. 13

COMPUTING DEVICE RACK LOCATION IDENTIFICATION SYSTEM

BACKGROUND

The present disclosure relates generally to information handling systems, and more particularly to identifying a rack location of an information handling system in a rack.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, switch devices, storage systems, and/or other computing devices known in the art, are often provided in racks. As will be appreciated by one of skill in the art in possession of the present disclosure, in datacenters hundreds of racks may house thousands of computing devices. In such environments it may be desirable to determine the precise location of any computing devices in the racks such as, for example, in situations in which the computing device needs to be replaced or reconfigured. Any inability to determine the precise location of a computing device in a rack will delay such replacement or reconfiguration, and may result in the identification of the wrong computing device for replacement or reconfiguration, which can cause issues with that computing device as well as other computing devices in the datacenter.

Current solutions to address these issues include having technicians manually inventory computing devices as they position those computing devices in racks by, for example, manually entering unique identifying information for each computing device (e.g., computing device serial numbers, computing device "service tags", etc.) into a database in association with the position of those computing devices in the racks, as well as manually changing that inventory when computing devices are moved between locations in rack(s). As will be appreciated by one of skill in the art, such solutions are time consuming as the technician must position each computing device in a rack, validate that computing device is in its correct location in the rack, record the identifier for the computing device in an inventory device (e.g., a mobile device being carried by the technician), record the rack location of the rack in which the computing device was positioned in the inventory device, and/or perform other manual inventorying operations that would be apparent to one of skill in the art. Furthermore, one of skill in the art will appreciate how this process must be repeated for each computing device that is positioned in a rack, as well as each time a computing device is moved to a different rack location.

One conventional solution to the issues discussed above is to provide a Radio Frequency Identification (RFID) system that includes RFID transmitters in the computing devices, and RFID readers on the racks that detect those RFID transmitters when their computing devices are positioned within some threshold distance from an RFID reader in a rack. However, the use of RFID systems presents some issues. For example, the use of RFID systems can only indicate that a RFID transmitter in a computing device is within the threshold distance from an RFID reader in a rack, but is not accurate enough to determine, for example, a particular rack location (e.g., a unit/rack unit location (U-location) in a rack). In a specific example, a computing device may be relocated from a first rack location in a first rack to a second rack location in an adjacent second rack, and the lack of precision with the RFID reader in identifying the location of the RFID transmitter in that computing device may result in the RFID system indicating that the computing device remains in the first rack location, and/or otherwise not identifying that the computing device has been moved to the second rack location. As such, the use of RFID systems often still requires technicians to manually identify the rack locations of computing devices.

Accordingly, it would be desirable to provide a computing device rack location identification system that addresses the issues discussed above.

SUMMARY

According to one embodiment, an Information Handling System (IHS) includes: a chassis that is configured to be positioned in any of a plurality of computing device housings defined by a rack that includes at least one respective rack location identifier located adjacent each of the plurality of computing device housings; a camera device that is included in the chassis and that is configured, when the chassis is positioned in any of the plurality of computing device housings defined by the rack, to capture an image of the at least one respective rack location identifier that is located adjacent that computing device housing; a processing system that is included in the chassis; and a memory system that is included in the chassis, that is coupled to the processing system, and that includes instructions that, when executed by the processing system, cause the processing system to provide a computing device rack location reporting engine that is configured to: receive, from the camera device when the chassis is positioned in the rack in a first computing device housing included in the plurality of computing device housings, a first image captured by the camera device of a first rack location identifier that is located adjacent the first computing device housing; and transmit first image information associated with the first image via a network to a computing device rack location tracking system.

BRIEF DESCRIPTION OF THE DRAWINGS

FIG. 13 is a flow chart illustrating an embodiment of a method for identifying a rack location of a computing device in a rack system.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
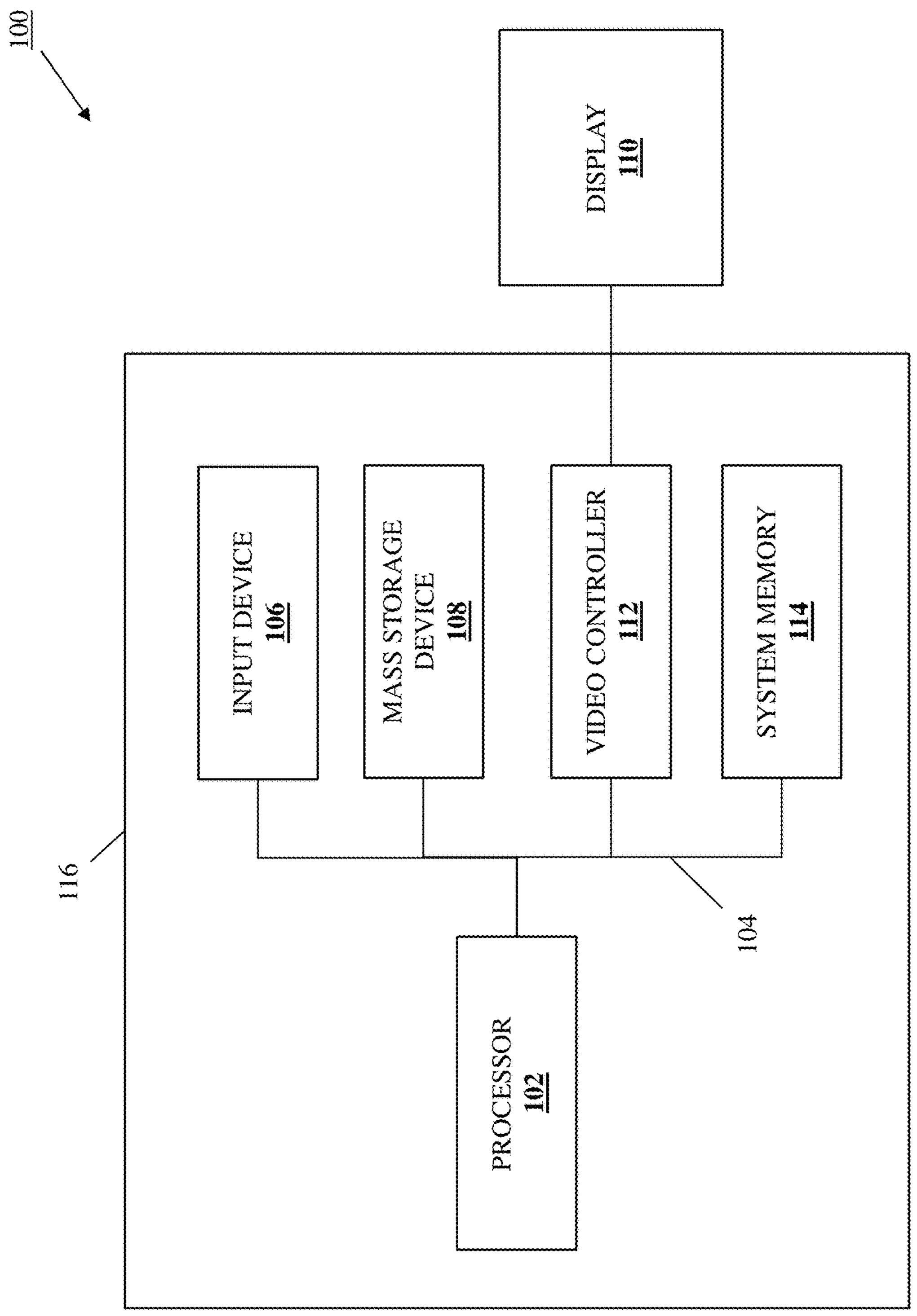
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
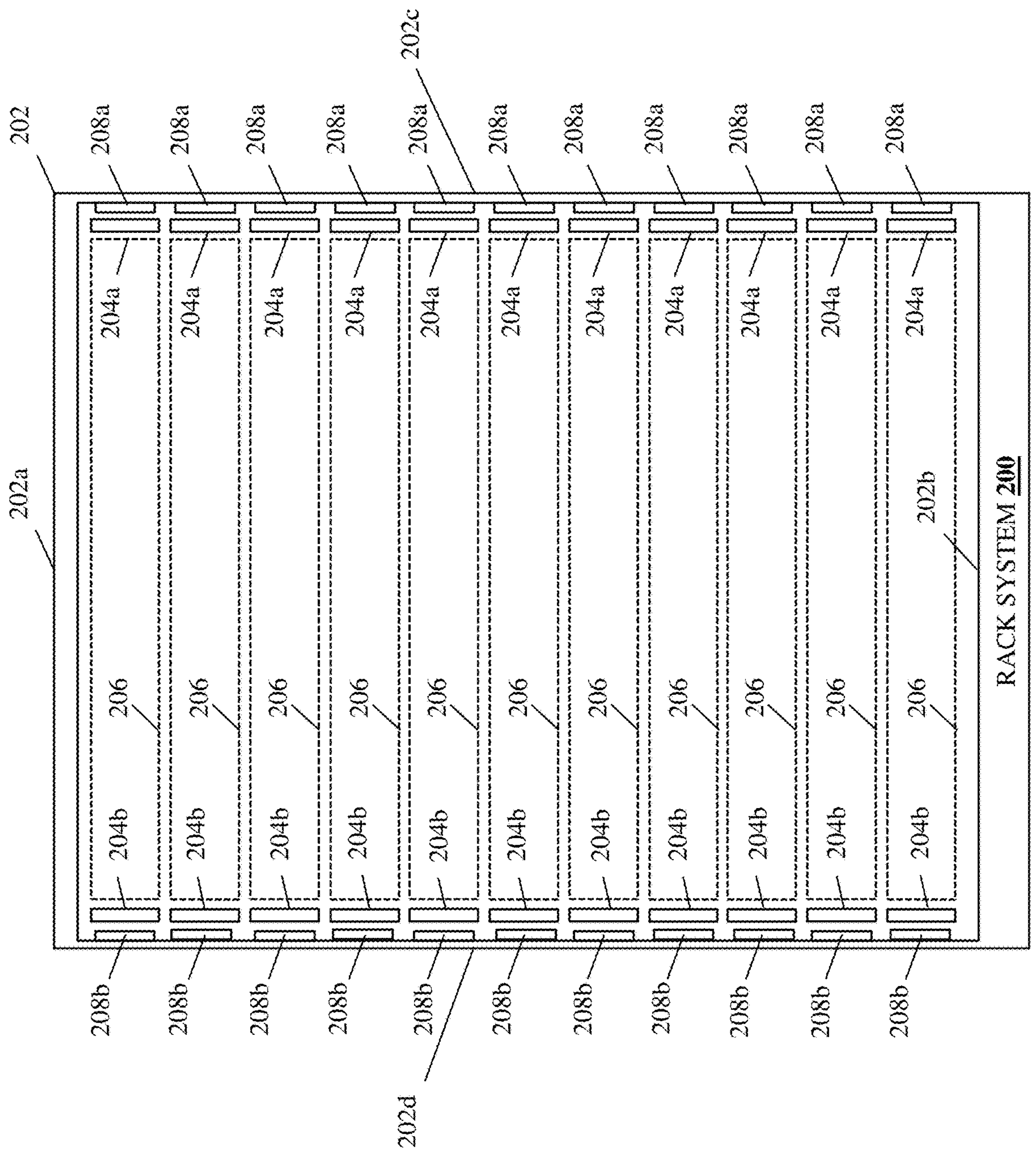
FIG. 2 is a schematic front view illustrating an embodiment of a rack system that may be included in the computing device rack location identification system of the present disclosure.

Referring now to FIG. 2, an embodiment of a rack system 200 is illustrated that may be included in the computing device location identification system of the present disclosure. As described below, the rack system 200 includes at least one rack location identifier adjacent each of its computing device housings for capture by a camera device on a computing device that is positioned in that computing device housing. The rack system 200 includes a rack chassis 202 having a top wall 202*a*, a bottom wall 202*b* that is located opposite the rack chassis 202 from the top wall 202*a*, a pair of opposing side walls 202*c* and 202*d* that each extend between the top wall 202*a* and the bottom wall 202*b* and that are located opposite the rack chassis 202 from each other. In the embodiments illustrated and described below, the rack system 200 includes a computing device mounting system that is included on the rack chassis 202 and that includes a plurality of computing device mounting subsystems 204*a* that are coupled to the side wall 202*c* of the rack chassis 202, and a plurality of computing device mounting subsystems 204*b* that are coupled to the side wall 202*d* of the rack chassis 202.

As will be appreciated by one of skill in the art in possession of the present disclosure and as discussed below, respective pairs of the computing device mounting subsystems 204*a* and 204*b* on opposite sides of the rack chassis 202 are configured to couple to a respective computing device to allow that computing device to be positioned in the rack chassis 202, and thus any of the computing device mounting subsystems 204*a* and 204*b* may include computing device coupling/securing features for providing such functionality while remaining within the scope of the present disclosure. In a specific example, any of all of the computing device mounting subsystems 204*a* and 204*b* may be provided by READYRAIL® computing device mounting subsystems available from DELL® Inc. of Round Rock, Texas, United States, which one of skill in the art in possession of the present disclosure will recognize include a variety of toolless mounting interfaces for mounting both sliding READYRAIL® computing device mounting subsystems (e.g., which allow a computing device coupled thereto to move in and out of a rack) and static READYRAIL® computing device mounting subsystems (e.g. which hold a computing device coupled thereto stationary in a rack) to a rack. However, while a specific example of a computing device mounting subsystem has been discussed, one of skill in the art in possession of the present disclosure will appreciate how other computing device mounting subsystems will fall within the scope of the present disclosure as well, as well as how the computing device mounting subsystem may be omitted from the rack system 200 in some embodiments.

The rack chassis 202 defines a plurality of computing device housings 206 between the top wall 202*a*, the bottom wall 202*b*, and the side walls 202*c* and 202*d*, with each computing device housing 206 defined between a respective pair of the plurality of computing device mounting subsystems 204*a* and 204*b*. The rack chassis 202 also includes at least one rack location identifier 208*a* located on the side wall 202*c* of the rack chassis 202 adjacent each of the plurality of computing device housings 206, and at least one rack location identifier 208*b* located on the side wall 202*d* of the rack chassis 202 adjacent each of the plurality of computing device housings 206. As will be appreciated by one of skill in the art in possession of the present disclosure, FIG. 2 illustrates an example of the rack system 200 in which at least one rack location identifier is located on each of the side walls 202*c* and 202*d* on opposite sides of each computing device housing 206 in order to allow a computing device that is positioned in that computing device housing 206 to capture an image of any one of those rack location identifiers as described in further detail below, thus allowing a camera device to be provided in that computing device on either side of the computing device. As such, one of skill in the art in possession of the present disclosure will appreciate how the rack location identifier(s) of the present disclosure may be provided only on one side wall of the rack system 200 (such that it is located on only one side of a computing device housing 206) while remaining within the scope of the present disclosure as well.

In the embodiments discussed below, the rack location identifiers 208*a* and 208*b* are illustrated and described as being provided by Quick Response (QR) codes, but one of skill in the art in possession of the present disclosure will appreciate how the rack location identifiers 208*a* and 208*b* may be provided by Universal Product Codes (UPCs), Data Matrix bar codes, and/or other identification coding that may be captured as described below while remaining within the scope of the present disclosure as well.

In an embodiment, each rack location identifier 208*a* and 208*b* may be associated with rack location identification information identifying its adjacent computing device housing 206, and one of skill in the art in possession of the present disclosure will appreciate how that rack location identification information may include explicit location information for that computing device housing 206 (e.g., information explicitly describing a datacenter, a rack, and a rack unit location adjacent those rack location identifiers 208*a* and 208*b*). In a specific example, during the installation or other provisioning of the rack system 200 in a datacenter, a rack system installer/technician may capture each of the rack location identifiers 208*a* and 208*b* adjacent each computing device housing 206 (e.g., using a camera on a mobile device), and may associate those rack location identifiers 208*a* and 208*b* with their rack location identification information that is provided by identifiers for that datacenter, that rack, and the rack unit location provided by the computing device housing 206 in a database (e.g., a database in the computing device rack location tracking system discussed below). However, while a specific example is provided, one of skill in the art in possession of the present disclosure will appreciate how the rack location identifiers 208*a* and 208*b* in the rack system 200 may be associated with any of a variety of information that may be used to identify their adjacent computing device housing 206 using any of a variety of techniques that will fall within the scope of the present disclosure as well.

Figure 3A:
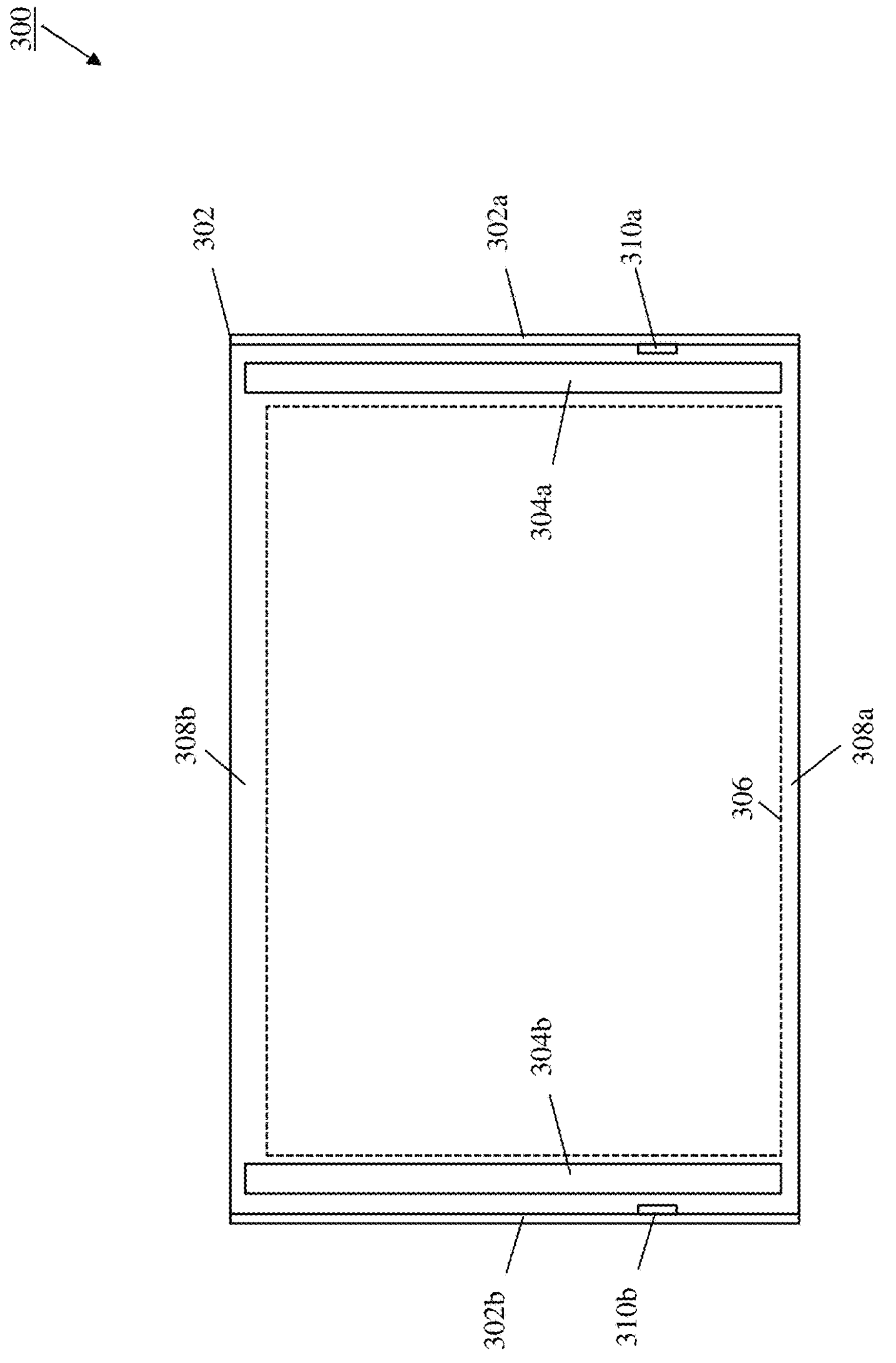
FIG. 3A is a schematic top cross-sectional view illustrating an embodiment of the rack system of FIG. 2.
Figure 3B:
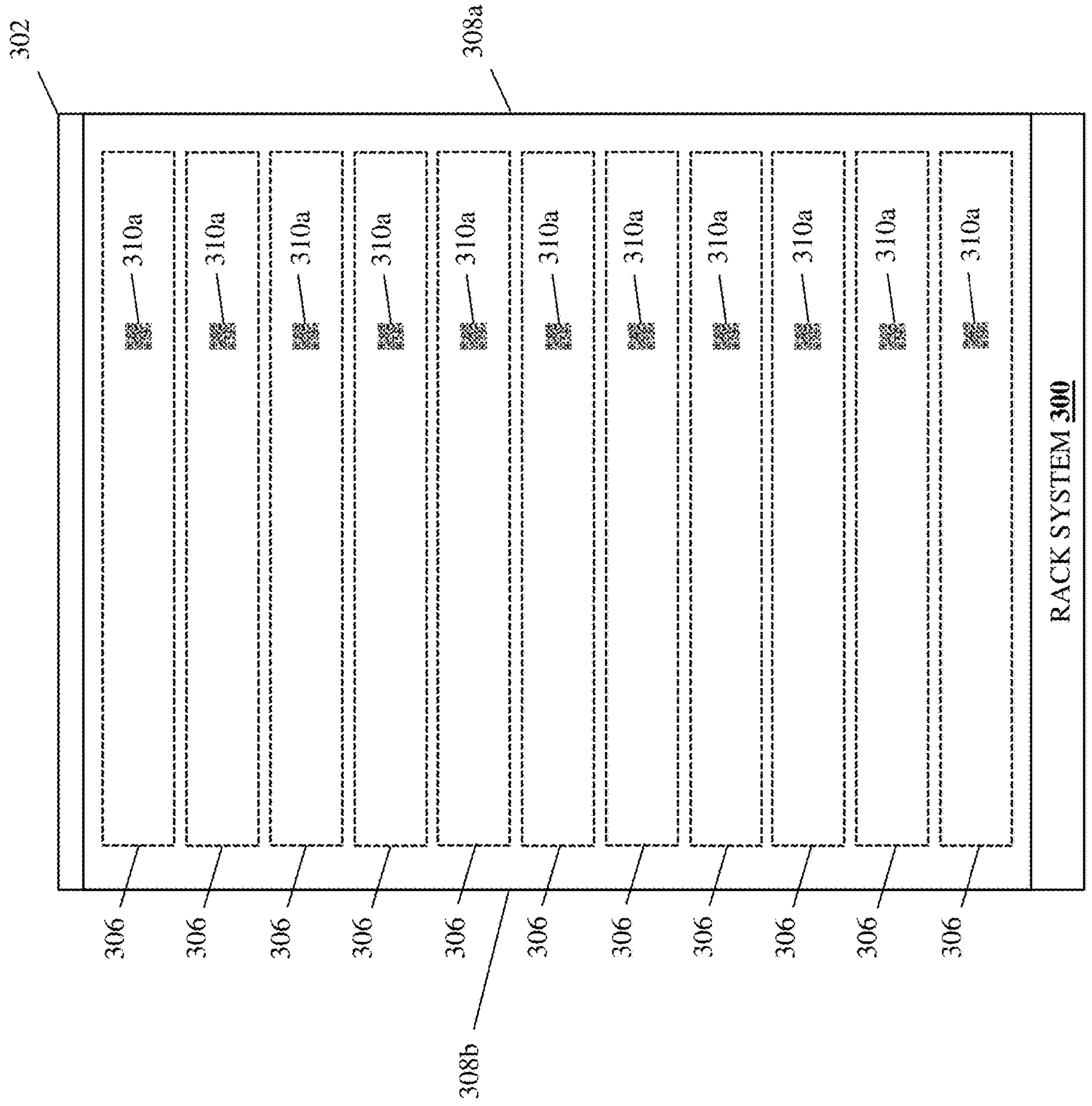
FIG. 3B is a schematic side cross-sectional view illustrating an embodiment of the rack system of FIG. 2.

Referring now to FIGS. 3A and 3B, an embodiment of a rack system 300 is illustrated that may provide a specific embodiment of the rack system 200 discussed above with reference to FIG. 2, with FIG. 3A illustrating a top cross-sectional view of the rack system 200/300, and FIG. 3B illustrating a side cross-sectional view of an inner side wall of the rack system 200/300. As can be seen in FIG. 3A, the rack system 300 includes a rack chassis 302 that may provide the rack chassis 202 discussed above with reference to FIG. 2, and the rack chassis 302 includes a pair of opposing side walls 302*a* and 302*b* that are located opposite the rack chassis 302 from each other and that may provide the side walls 202*c* and 202*d* discussed above with reference to FIG. 2. The rack system 300 also includes a computing device mounting subsystem on the rack chassis 302 that, in the embodiment illustrated in FIG. 3A, includes a computing device mounting subsystem 304*a* that is located on the side wall 302*a* of the rack chassis 302, and a computing device mounting subsystem 304*b* that is located on the side wall 302*b* of the rack chassis 302. As will be appreciated by one of skill in the art in possession of the present disclosure, the pair of computing device mounting subsystems 304*a* and 304*b* illustrated in FIG. 3A may provide any pair of the computing device mounting subsystems 204*a* and 204*b* discussed above with reference to FIG. 2.

As can be seen in FIGS. 3A and 3B, the rack chassis 302 defines a plurality of computing device housings 306 between the side walls 302*a* and 302*b*, and one of skill in the art in possession of the present disclosure will appreciate how each computing device housing 306 is defined between a respective pair of computing device mounting subsystems 304*a* and 304*b* similarly as described above with reference to FIG. 2. Furthermore, FIGS. 3A and 3B illustrate how a rack entrance 308*a* may be defined on a first/"front" side of the rack chassis 302, while a rack exit 308*b* may be defined on a second/"rear" side of the rack chassis 302 and opposite the rack chassis 302 from the rack entrance 308*a*.

The embodiment of the rack system 300 of FIGS. 3A and 3B illustrates how, for each computing device housing 306, the rack chassis 302 may include a single rack location identifier 310*a* located on the side wall 302*a* of the rack chassis 302 and adjacent that computing device housing 306, and a single rack location identifier 310*b* located on the side wall 302*b* of the rack chassis 302 and adjacent that computing device housing 306. As will be appreciated by one of skill in the art in possession of the present disclosure, the embodiment of FIGS. 3A and 3B illustrates an example of the rack system 200/300 in which a single rack location identifier is located on each of the side walls 202*c* and 202*d* on opposite sides of each computing device housing 206, which as described below may require a standardized or known positioning of camera devices in computing devices in order to allow those camera devices to capture an image of either of those rack location identifiers when their computing device is positioned in the computing device housing 206. As such, one of skill in the art in possession of the present disclosure will appreciate how the location of each single rack location identifier relative to its adjacent computing device housing 206 may vary from that illustrated in FIGS. 3A and 3B.

Similarly as described above, the provisioning of the respective single rack location identifier on each of the side walls 202*c* and 202*d* on opposite sides of each computing device housing 206 will allow a computing device that is positioned in that computing device housing 206 to capture an image of either of those rack location identifiers as described in further detail below, thus allowing a camera device to be provided in that computing device on either side of the computing device. However, one of skill in the art in possession of the present disclosure will appreciate how a single rack location identifier of the present disclosure may be provided only on one side wall of the rack system 200 (such that it is located on only one side of a computing device housing 206) while remaining within the scope of the present disclosure as well.

Figure 4A:
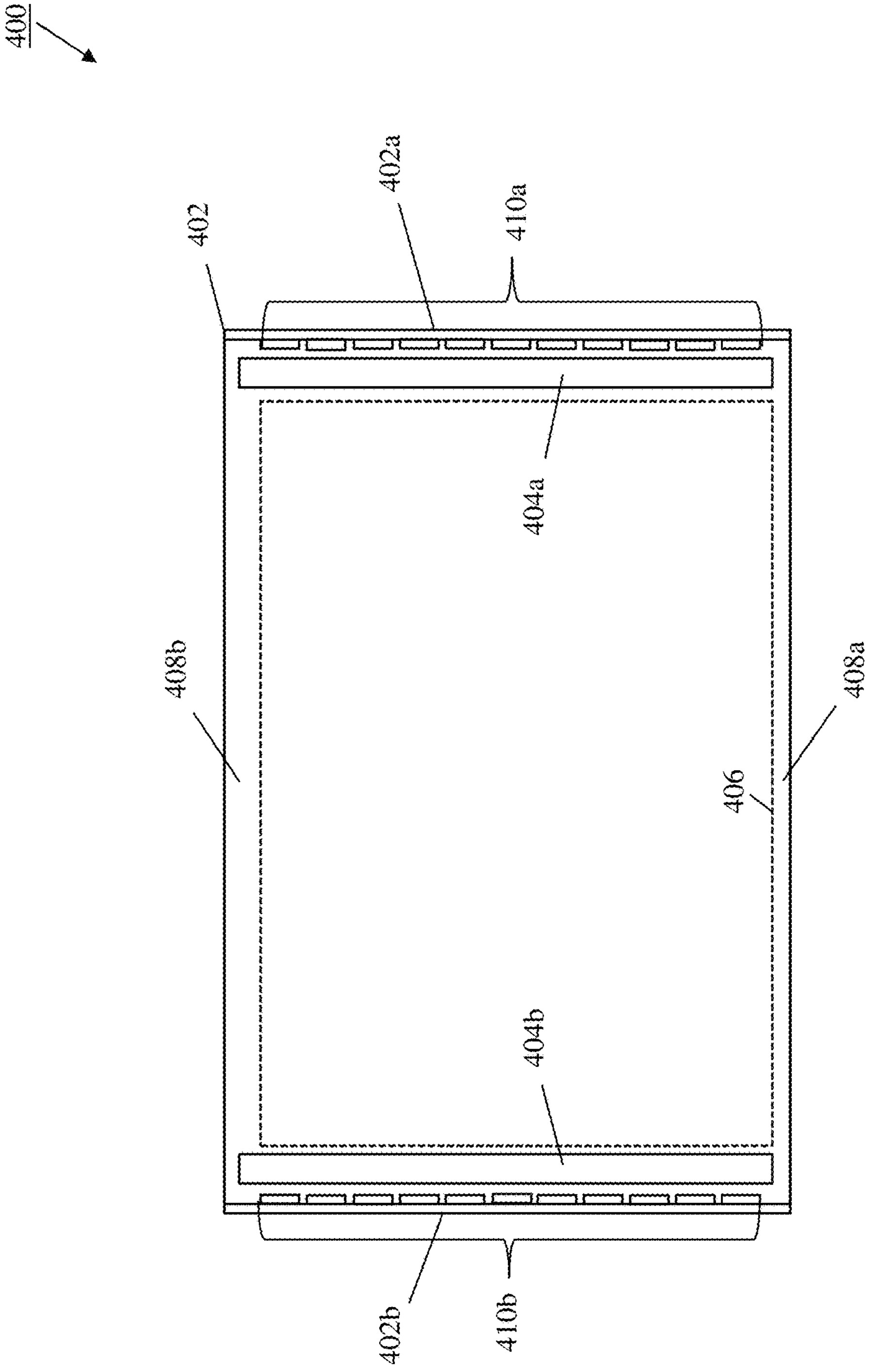
FIG. 4A is a schematic top cross-sectional view illustrating an embodiment of the rack system of FIG. 2.
Figure 4B:
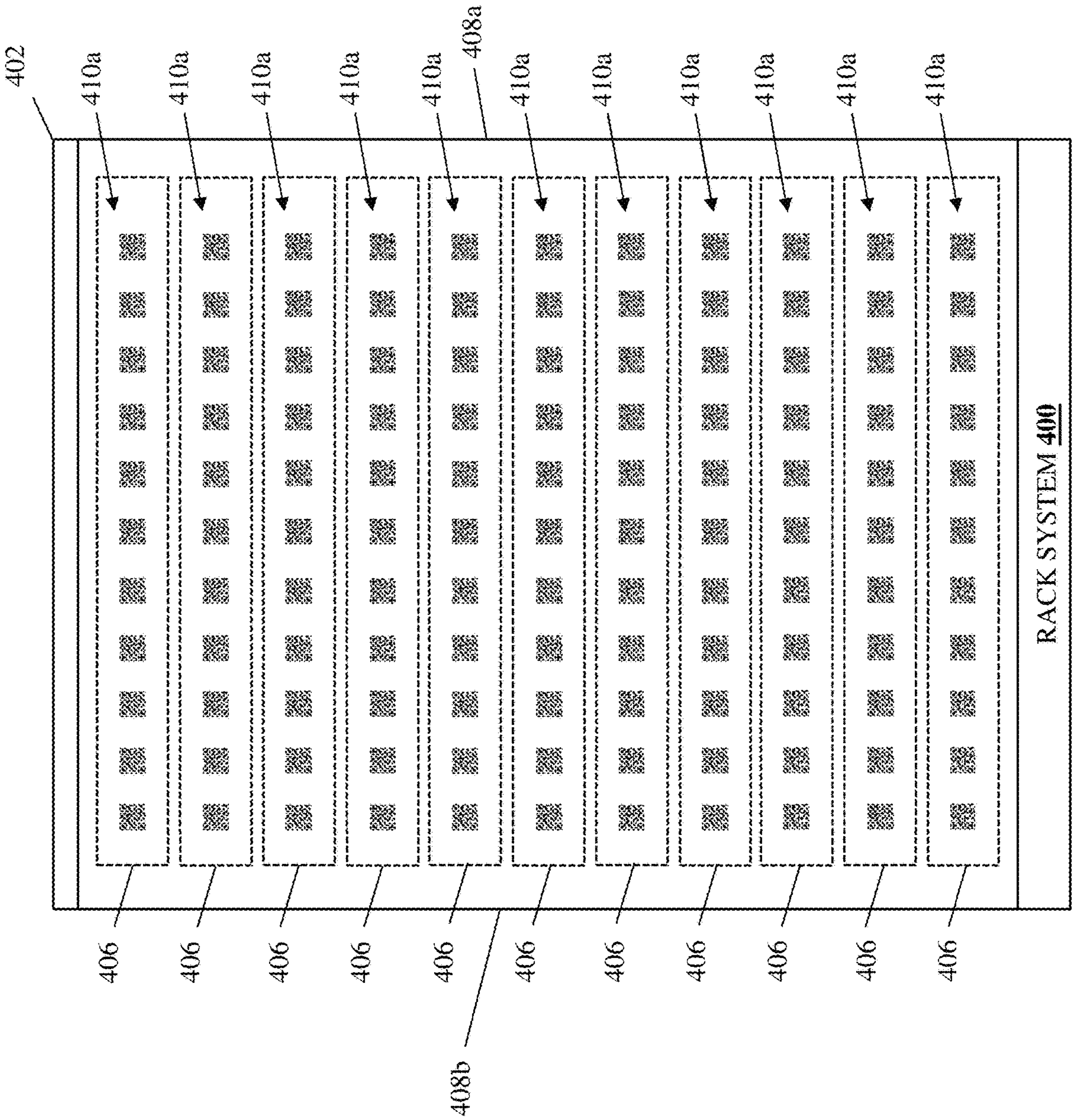
FIG. 4B is a schematic side cross-sectional view illustrating an embodiment of the rack system of FIG. 2.

Referring now to FIGS. 4A and 4B, an embodiment of a rack system 400 is illustrated that may provide a specific embodiment the rack system 200 discussed above with reference to FIG. 2, with FIG. 4A illustrating a top cross-sectional view of the rack system 200/400, and FIG. 4B illustrating a side cross-sectional view of an inner side wall of the rack system 200/400. As can be seen in FIG. 4A, the rack system 400 includes a rack chassis 402 that may provide the rack chassis 202 discussed above with reference to FIG. 2, and the rack chassis 402 includes a pair of opposing side walls 402*a* and 402*b* that are located opposite the rack chassis 402 from each other and that may provide the side walls 202*c* and 202*d* discussed above with reference to FIG. 2. The rack system 400 also includes a computing device mounting subsystem on the rack chassis 402 that, in the embodiment illustrated in FIG. 4A, includes a computing device mounting subsystem 404*a* that is located on the side wall 402*a* of the rack chassis 402, and a computing device mounting subsystem 404*b* that is located on from the side wall 402*b* of the rack chassis 402. As will be appreciated by one of skill in the art in possession of the present disclosure, the pair of computing device mounting subsystems 404*a* and 404*b* illustrated in the FIG. 4A may provide any pair of the computing device mounting subsystems 204*a* and 204*b* discussed above with reference to FIG. 2.

As can be seen in FIGS. 4A and 4B, the rack chassis 402 defines a plurality of computing device housings 406 between the side walls 402*a* and 402*b*, and one of skill in the art in possession of the present disclosure will appreciate how each computing device housing 406 is defined between a respective pair of computing device mounting subsystems 404*a* and 404*b* similarly as described above with reference to FIG. 2. Furthermore, FIGS. 4A and 4B illustrate how a rack entrance 408*a* may be defined on a first/"front" side of the rack chassis 402, while a rack exit 408*b* may be defined on a second/"rear" side of the rack chassis 402 and opposite the rack chassis 402 from the rack entrance 408*a*.

The embodiment of the rack system 400 of FIGS. 4A and 4B illustrates how, for each computing device housing 406, the rack chassis 402 may include a plurality of rack location identifiers 410*a* located on the side wall 402*a* of the rack chassis 402 and adjacent that computing device housing 406, and a plurality of rack location identifiers 410*b* located on the side wall 402*b* of the rack chassis 402 and adjacent that computing device housing 406. As will be appreciated by one of skill in the art in possession of the present disclosure, the embodiment of FIGS. 4A and 4B illustrates an example of the rack system 200/400 in which a plurality of rack location identifiers are located on each side of the side walls 402*c* and 402*d* on opposite sides of each computing device housing 406, which as described below allows cameras positioned at different locations in computing devices to capture an image of one or more of the plurality of rack location identifiers when the computing device is positioned in the computing device housing 406. While a specific configuration of the plurality of rack location identifiers 410*a* is illustrated in FIG. 4B, one of skill in the art in possession of the present disclosure will appreciate how any technique (e.g., "wallpapering") for providing the plurality of rack location identifiers adjacent a computing device housing 406 will fall within the scope of the present disclosure as well.

Similarly as described above, provisioning of the plurality of rack location identifiers on each of the side walls 402*c* and 402*d* on opposite sides of each computing device housing 406 will allow a computing device that is positioned in that computing device housing 406 to capture an image of at least one of the plurality of rack location identifiers as described in further detail below, thus allowing a camera device to be provided in that computing device at a variety of positions on either side of the computing device. However, one of skill in the art in possession of the present disclosure will appreciate how the plurality of rack location identifiers of the present disclosure may be provided on only one side wall of the rack system 400 (i.e., such that the plurality of rack location identifiers is located on only one side of a computing device housing 406) while remaining within the scope of the present disclosure as well.

Figure 5A:
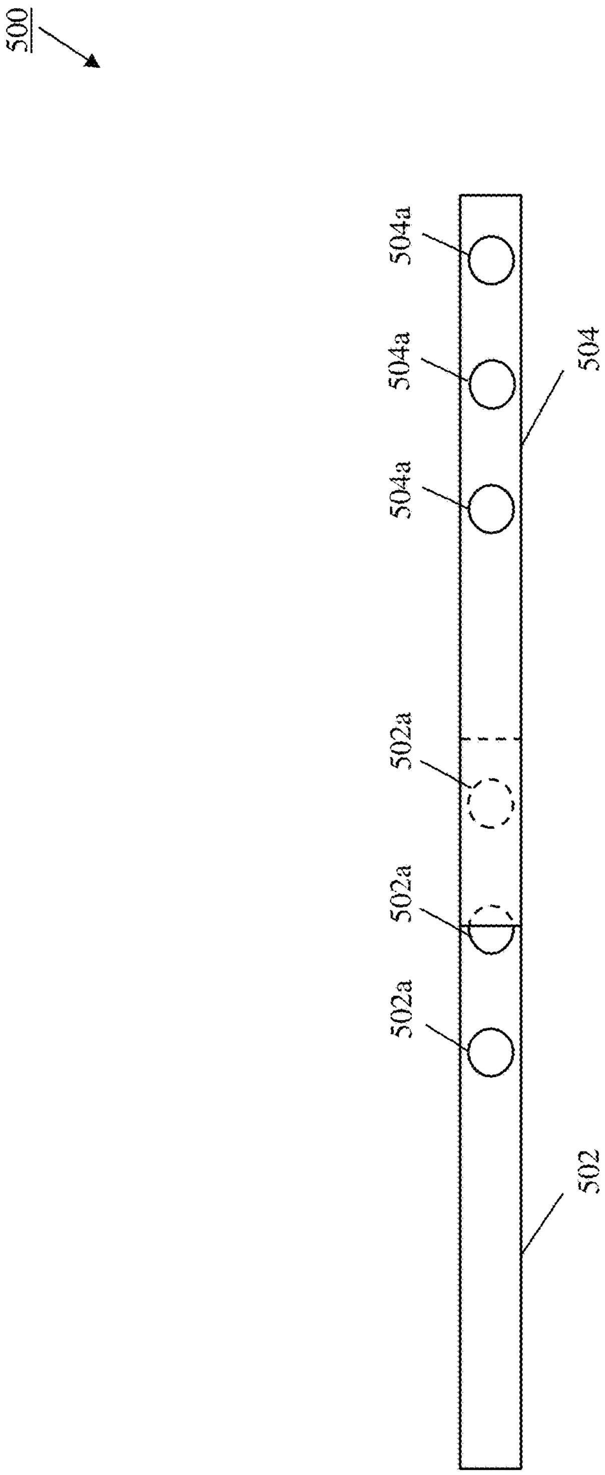
FIG. 5A is a schematic side view illustrating an embodiment of a rack mounting subsystem which may be utilized with the rack system of FIGS. 2, 3A and 3B, or 4A and 4B, in an extended orientation.
Figure 5B:
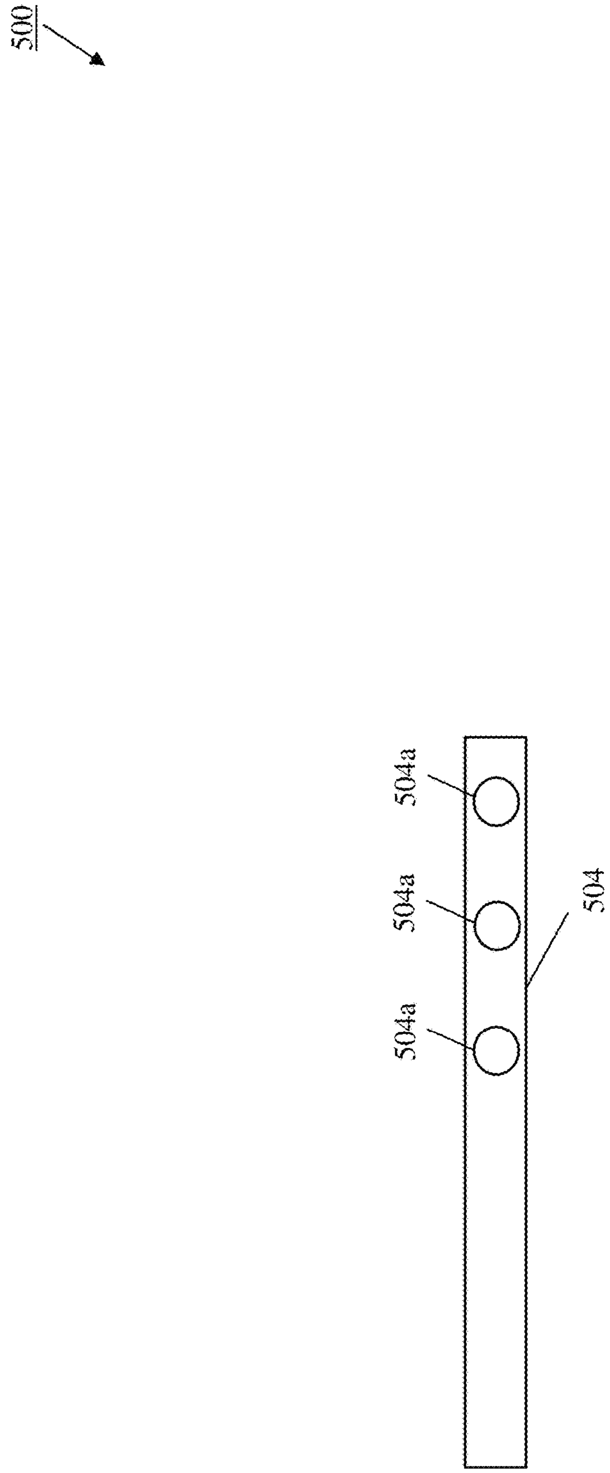
FIG. 5B is a schematic side view illustrating an embodiment of the rack mounting subsystem of FIG. 5A in a retracted orientation.

Referring now to FIGS. 5A and 5B, an embodiment of a computing device mounting subsystem 500 is illustrated that may provide any of the computing device mounting subsystems 204*a* and 204*b* discussed above with reference to FIG. 2, the computing device mounting subsystems 304*a* and 304*b* discussed above with reference to FIGS. 3A and 3B, and the computing device mounting subsystems 404*a* and 404*b* discussed above with reference to FIGS. 4A and 4B. In the specific example illustrated in FIGS. 5A and 5B, the computing device mounting subsystem 500 includes a first computing device mounting element 502 that is configured to be mounted to any of the side walls 202*c* and 202*d* of the rack system 200, any of the side walls 302*a* and 302*b* of the rack system 300, and any of the side walls 402*a* and 402*b* of the rack system 400 discussed above such that the first computing device mounting element 502 is located adjacent a computing device housing 206, 306, or 406 as described above, and a second computing device mounting element 504 that is moveably coupled to the first computing device mounting element 502 such that it is configured to extend out of and retract into the rack chassis to which it is coupled by moving it relative to the first computing device mounting element 502 between an extended orientation illustrated in FIG. 5A, and a retracted orientation illustrated in FIG. 5B.

In the illustrated embodiment, the first computing device mounting element 502 defines a plurality of apertures 502*a* in a spaced-apart orientation along the length of the first computing device mounting element 502, while the second computing device mounting element 504 defines a plurality of apertures 504*a* in a spaced-apart orientation along the length of the second computing device mounting element 504. As can be seen in FIGS. 5A and 5B, the apertures 502*a* and 504*a* are configured to align with each other when the second computing device mounting element 504 is provided in the retracted orientation illustrated in FIG. 5B. As discussed below, the computing device mounting subsystem 500 may be utilized in situations in which the computing device mounting system in the rack system 200, 300, or 400 would otherwise obstruct a line-of-sight needed to capture the rack location identifier(s) adjacent the computing device housings 206 or 306, or the computing device identifier(s) on a computing device (i.e., with the apertures 502*a* and 504*a* configured to align to provide line of sight to at least one of those plurality of rack location identifiers or computing device identifiers).

Figure 6:
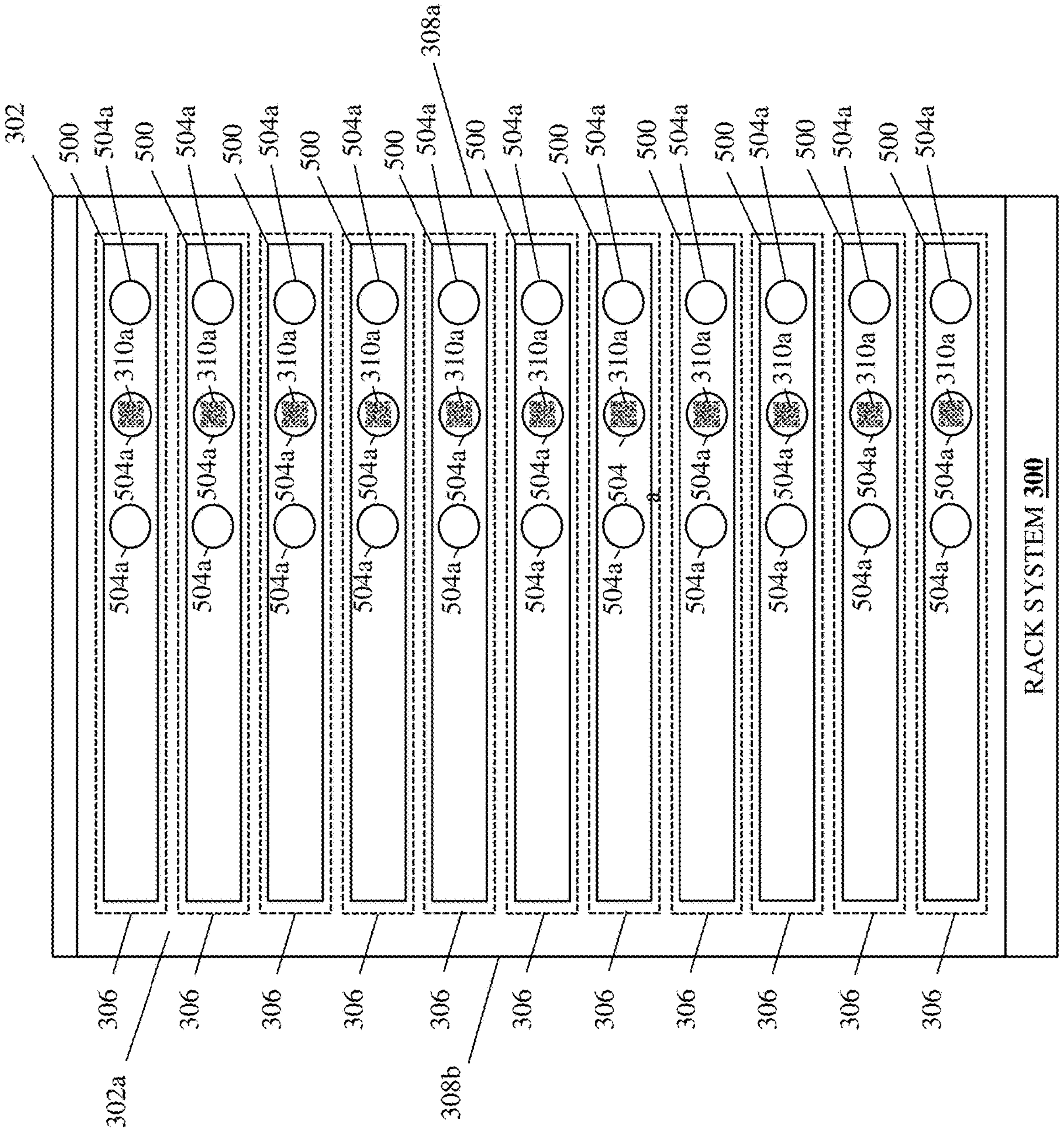
FIG. 6 is a schematic side cross-sectional view illustrating an embodiment of the rack system of FIGS. 3A and 3B including a plurality of the rack mounting subsystem of FIGS. 5A and 5B in the retracted orientation.

Referring now to FIG. 6, an embodiment of the rack system 300 of FIG. 3B is illustrated that provides a side cross-sectional view of the inner side wall 302*a*, with a respective computing device mounting subsystem 500 of FIGS. 5A and 5B providing each of the plurality of computing device mounting subsystems 304*a*. As discussed above, the first computing device mounting element 502 included in each computing device mounting subsystem 500 may be mounted to the side wall 302*a* of the rack system 300 adjacent a respective computing device housing 306, with the second computing device mounting element 504 in each computing device mounting subsystem 500 moveably coupled to the first computing device mounting element 502.

As can be seen in FIG. 6 and as discussed above with reference to FIGS. 5A and 5B, when the second computing device mounting element 504 on each computing device mounting subsystem 500 is provided in the retracted orientation, the plurality of apertures 504*a* and 502*a* on that computing device mounting subsystem 500 align to allow the rack location identifier 310*a* provided adjacent its computing device housing 306 to be visible through one of the pair of aligned apertures 504*a* and 502*a*. While not illustrated or described in detail, one of skill in the art in possession of the present disclosure will appreciate how each computing device mounting subsystem 304*b* provided adjacent a computing device housing 306 on the rack system 300 of FIG. 3A may be provided by a respective computing device mounting subsystem 500 that operates similarly as described above to allow the rack location identifier 310*b* provided adjacent its computing device housing 306 to be visible through one of the pair of aligned apertures 504*a* and 502*a* as well.

Figure 7:
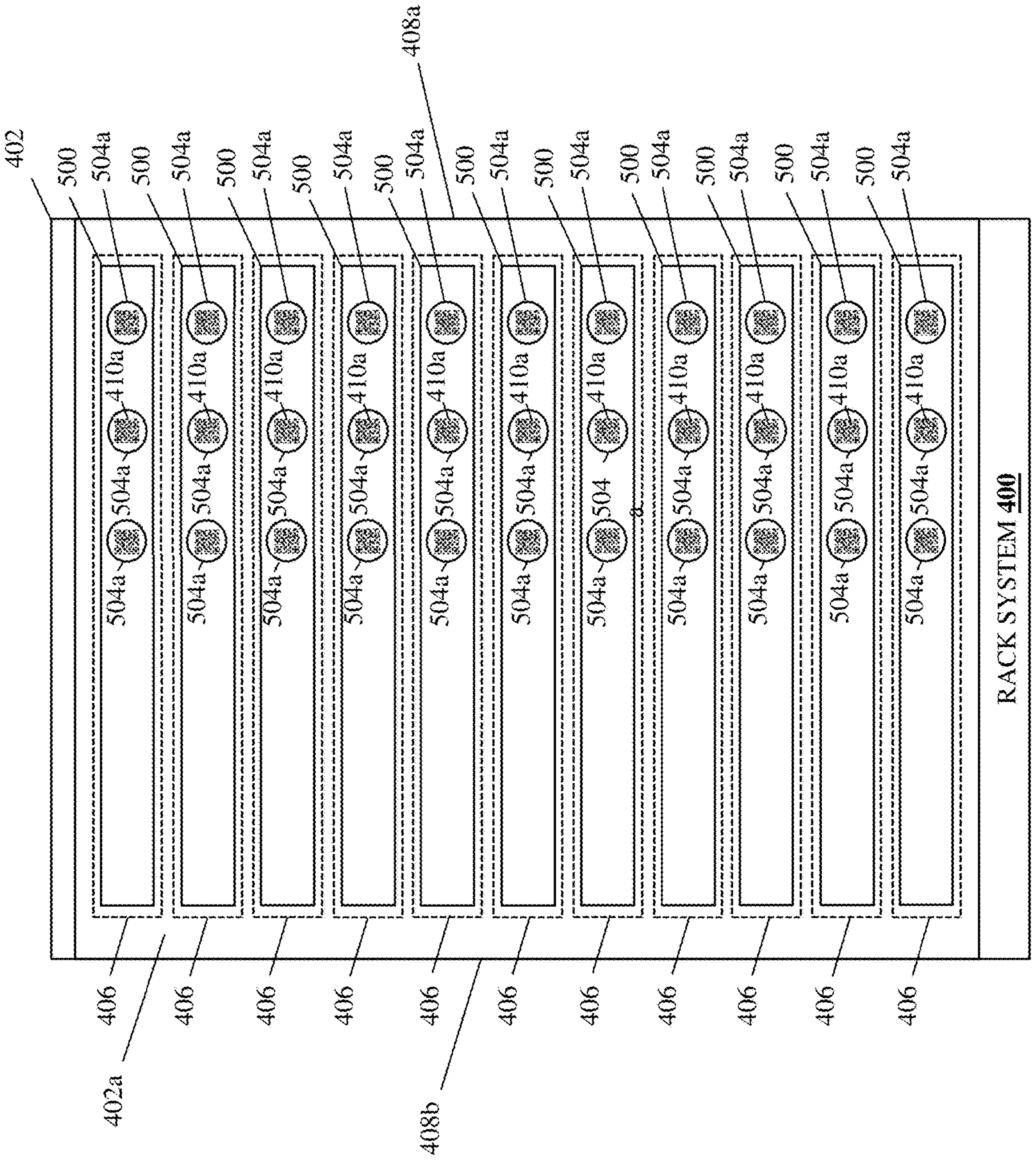
FIG. 7 is a schematic side cross-sectional view illustrating an embodiment of the rack system of FIGS. 4A and 4B including a plurality of the rack mounting subsystem of FIGS. 5A and 5B in the retracted orientation.

Referring now to FIG. 7, an embodiment of the rack system 400 of FIG. 4B is illustrated that provides a side cross-sectional view of the inner side wall 402*a*, with a respective computing device mounting subsystem 500 of FIGS. 5A and 5B providing each of the plurality of computing device mounting subsystems 404*a*. As discussed above, the first computing device mounting element 502 included in each computing device mounting subsystem 500 may be mounted to the side wall 402*a* of the rack system 400 adjacent a respective computing device housing 406, with the second computing device mounting element 504 in each computing device mounting subsystem 500 moveably coupled to the first computing device mounting element 502.

As can be seen in FIG. 7 and as discussed above with reference to FIGS. 5A and 5B, when the second computing device mounting element 504 on each computing device mounting subsystem 500 is provided in the retracted orientation, the plurality of apertures 504*a* and 502*a* on that computing device mounting subsystem 500 align to allow at least one of the plurality of rack location identifiers 410*a* provided adjacent its computing device housing 406 to be visible through at least one pair of aligned apertures 504*a* and 502*a*. While not illustrated or described in detail, one of skill in the art in possession of the present disclosure will appreciate how each computing device mounting subsystem 404*b* provided adjacent a computing device housing 406 on the rack system 400 of FIG. 4A may be provided by a respective computing device mounting subsystem 500 that operates similarly as described above to allow the plurality of rack location identifiers 410*b* provided adjacent its computing device housing 406 to be visible through at least one of the pair of aligned apertures 502*a* and 504*b* as well.

Figure 8A:
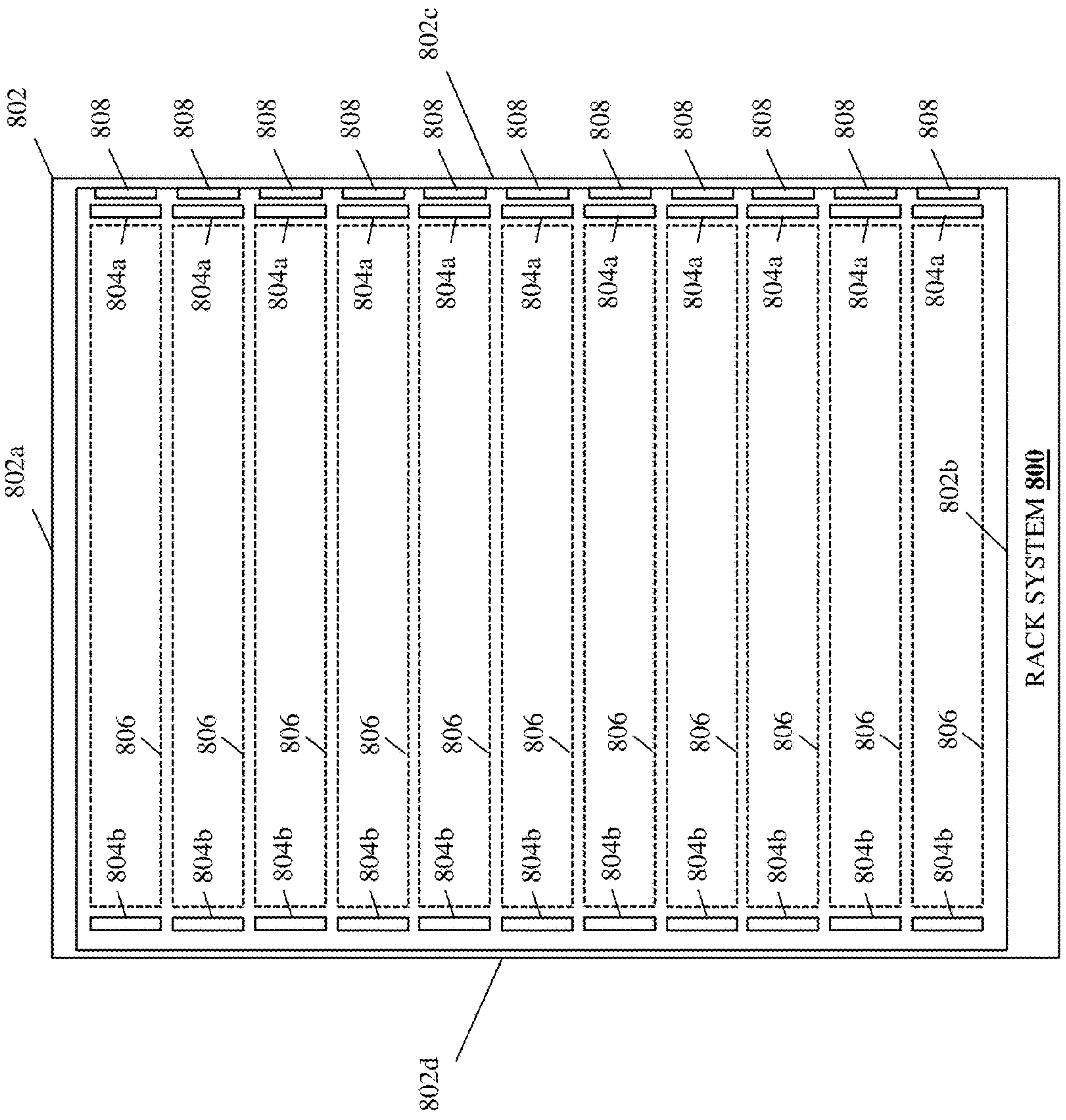
FIG. 8A is a schematic front view illustrating an embodiment of a rack system that may be included in the computing device rack location identification system of the present disclosure.

Referring now to FIG. 8A, an embodiment of a rack system 800 is illustrated that may be included in the computing device location identification system of the present disclosure. As described below, the rack system 800 includes at least one camera device adjacent each of its computing device housings to capture a computing device identifier included on a computing device that is positioned in that computing device housing. The rack system 800 includes a rack chassis 802 having a top wall 802*a*, a bottom wall 802*b* that is located opposite the rack chassis 802 from the top wall 802*a*, a pair of opposing side walls 802*c* and 802*d* that each extend between the top wall 802*a* and the bottom wall 802*b* and that are located opposite the rack chassis 802 from each other. In the embodiments illustrated and described below, the rack system 800 includes a computing device mounting system that is included on the rack chassis 802 and that includes a plurality of computing device mounting subsystems 804*a* that are coupled to the side wall 802*c* of the rack chassis 802, and a plurality of computing device mounting subsystems 804*b* that are coupled to the side wall 802*d* of the rack chassis 802.

As will be appreciated by one of skill in the art in possession of the present disclosure and as discussed below, respective pairs of the computing device mounting subsystems 804*a* and 804*b* on opposite sides of the rack chassis 802 are configured to couple to a respective computing device to allow that computing device to be positioned in the rack chassis 802, and thus any of the computing device mounting subsystems 804*a* and 804*b* may include computing device coupling/securing features for providing such functionality while remaining within the scope of the present disclosure. Similarly as discussed above with reference to FIG. 2, any of the computing device mounting subsystems 804*a* and 804*b* may be provided by READYRAIL® computing device mounting subsystems. However, while a specific example of a computing device mounting subsystem has been discussed, one of skill in the art in possession of the present disclosure will appreciate how other computing device mounting subsystems will fall within the scope of the present disclosure as well, as well as how the computing device mounting system may be omitted from the rack system 800 in some embodiments.

The rack chassis 802 defines a plurality of computing device housings 806 between the top wall 802*a*, the bottom wall 802*b*, and the side walls 802*c* and 802*d*, with each computing device housing 806 defined between a respective pair of the plurality of computing device mounting subsystems 804*a* and 804*b*. The rack chassis 802 also includes a plurality of camera devices 808 that are each located on the side wall 802*c* of the rack chassis 802 adjacent a respective computing device housing 806. FIG. 8A illustrates an example of the rack system 800 in which a respective camera device 808 is located on the side wall 802*c* adjacent each computing device housing 806, and as discussed below each camera device 808 is configured to capture an image of a computing device identifier that is provided on a computing device and that faces the side wall 802*c* when that computing device is positioned in that computing device housing 806. While not illustrated, one of skill in the art in possession of the present disclosure will appreciate that a plurality of camera devices may be located on the side wall 802*d* adjacent each computing device housing 806 in order to allow those camera devices to capture an image of a computing device identifier that may be provided on a computing device and that faces the side wall 802*d* when that computing device is positioned in that computing device housing 806.

In an embodiment, each camera device 808 may include rack location identification information associated with its adjacent computing device housing 806, and one of skill in the art in possession of the present disclosure will appreciate how that rack location identification information may include explicit location information for that computing device housing 806 (e.g., information explicitly describing a datacenter, a rack, and a rack unit location adjacent that camera device 808), location information that may be associated with that computing device housing 806 (e.g., a serial number or other information identifying the camera device that is associated in a database with a datacenter, a rack, and a rack unit location adjacent that camera device 808), etc. However, while a few specific examples are provided, one of skill in the art in possession of the present disclosure will appreciate how the camera devices 808 in the rack system 800 may be associated with any of a variety of information that may be used to identify their adjacent computing device housing 806.

Figure 8B:
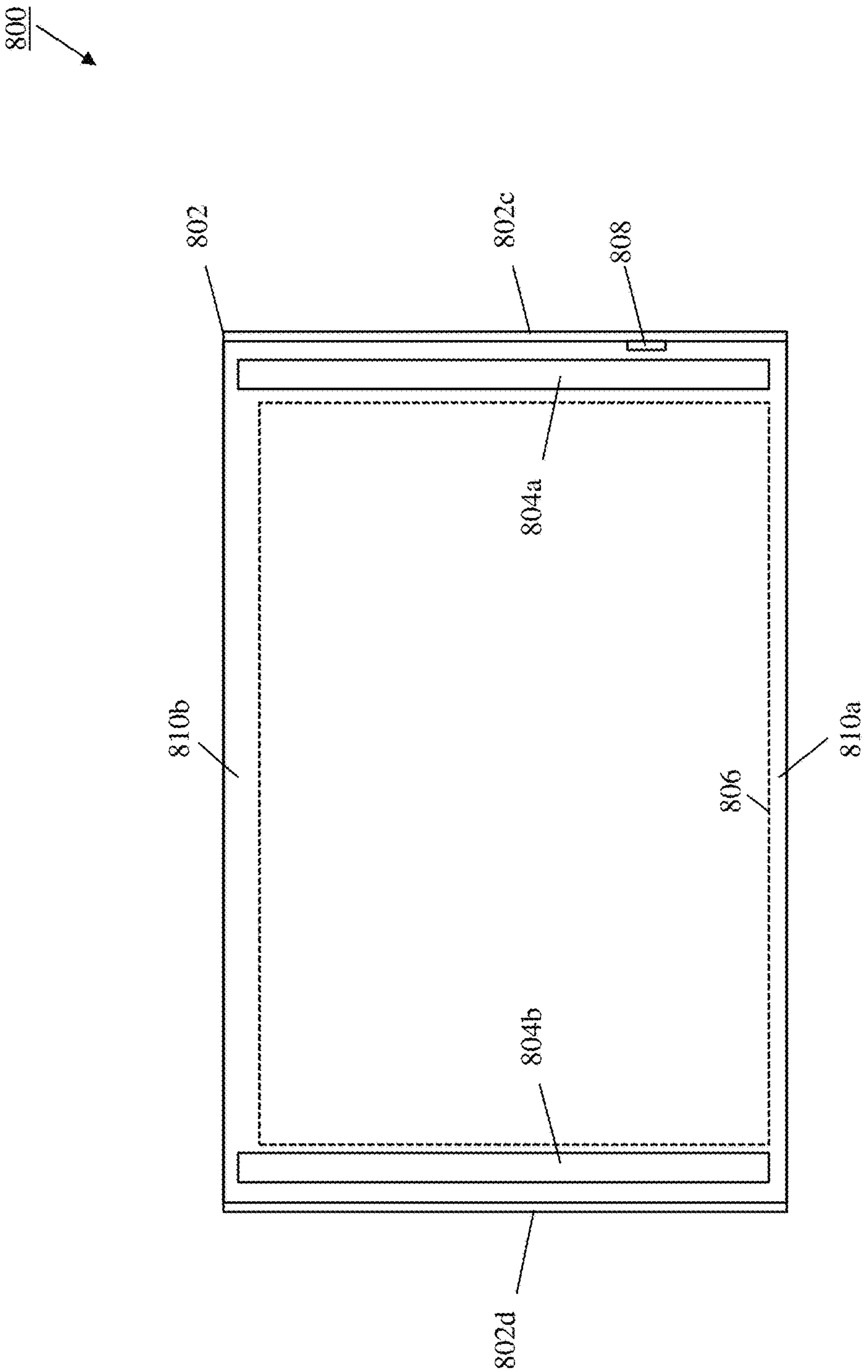
FIG. 8B is a schematic top cross-sectional view illustrating an embodiment of the rack system of FIG. 8A.
Figure 8C:
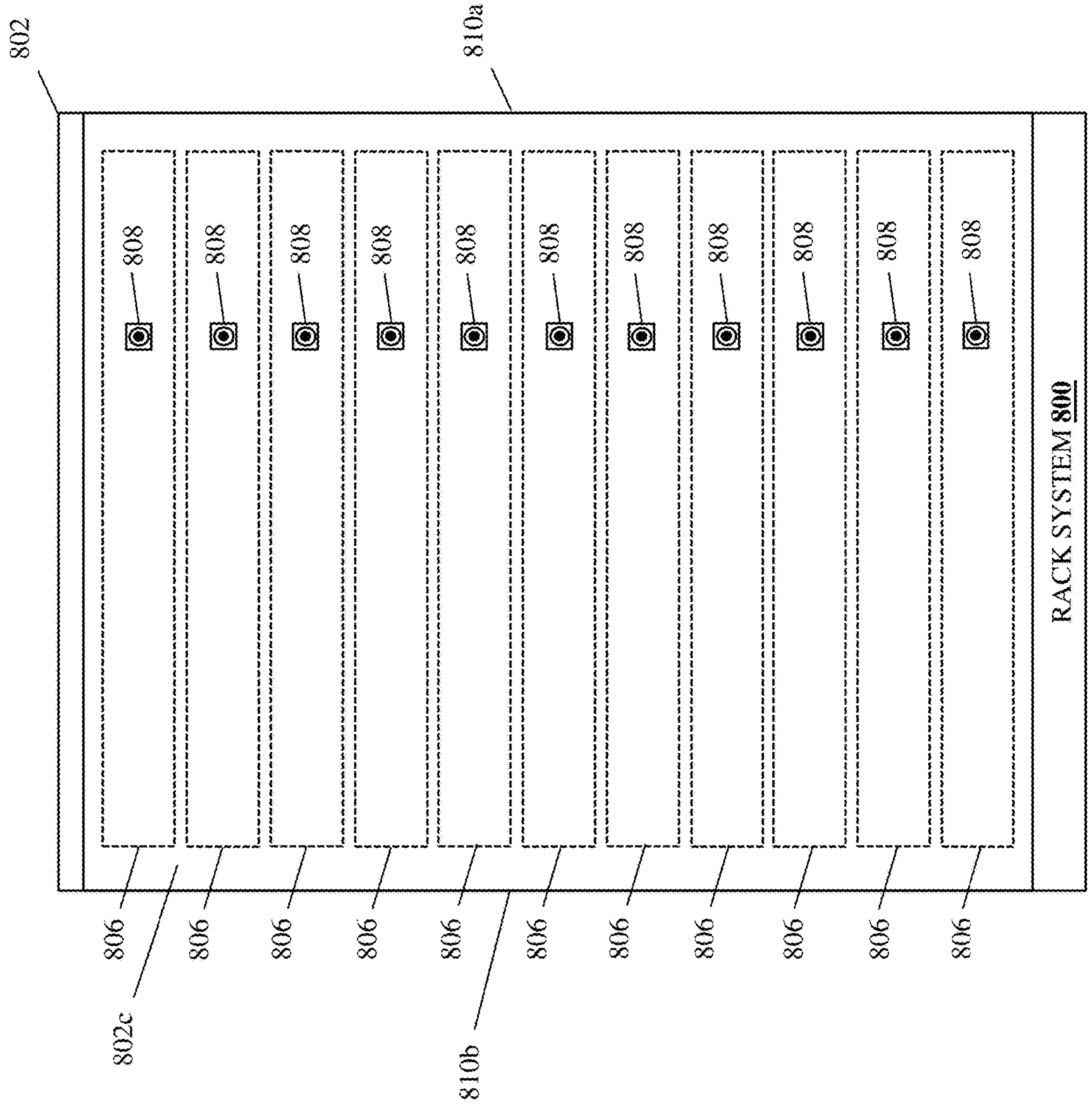
FIG. 8C is a schematic side cross-sectional view illustrating an embodiment of the rack system of FIG. 8A.

Referring now to FIGS. 8B and 8C, an embodiment of the rack system 800 is illustrated, with FIG. 8B illustrating a top cross-sectional view of the rack system 800, and FIG. 8C illustrating a side cross-sectional view of an inner side wall 802*c* of the rack system 800. FIGS. 8B and 8C illustrate how a rack entrance 810*a* may be defined on a first/"front" side of the rack chassis 802, while a rack exit 810*b* may be defined on a second/"rear" side of the rack chassis 802 and opposite the rack chassis 802 from the rack entrance 810*a*.

The embodiment of the rack system 800 of FIGS. 8B and 8C illustrates how, for each computing device housing 806, the rack chassis 802 may include a single camera device 808 located on the side wall 802*c* of the rack chassis 802 and adjacent that computing device housing 806. As will be appreciated by one of skill in the art in possession of the present disclosure, the embodiment of FIGS. 8B and 8C illustrates an example of the rack system 800 in which a single camera device 808 is located on the side wall 802*c* adjacent each of the computing device housings 806, which as described below may require a standardized or known positioning of computing device identifiers on computing devices in order to allow those camera devices to capture an image of the computing device identifier on a computing device when that computing device is positioned in its adjacent computing device housing 806. As such, one of skill in the art in possession of the present disclosure will appreciate how the location of each single camera device 808 relative to its adjacent computing device housing 806 may vary from that illustrated in FIGS. 8B and 8C.

Figure 9:
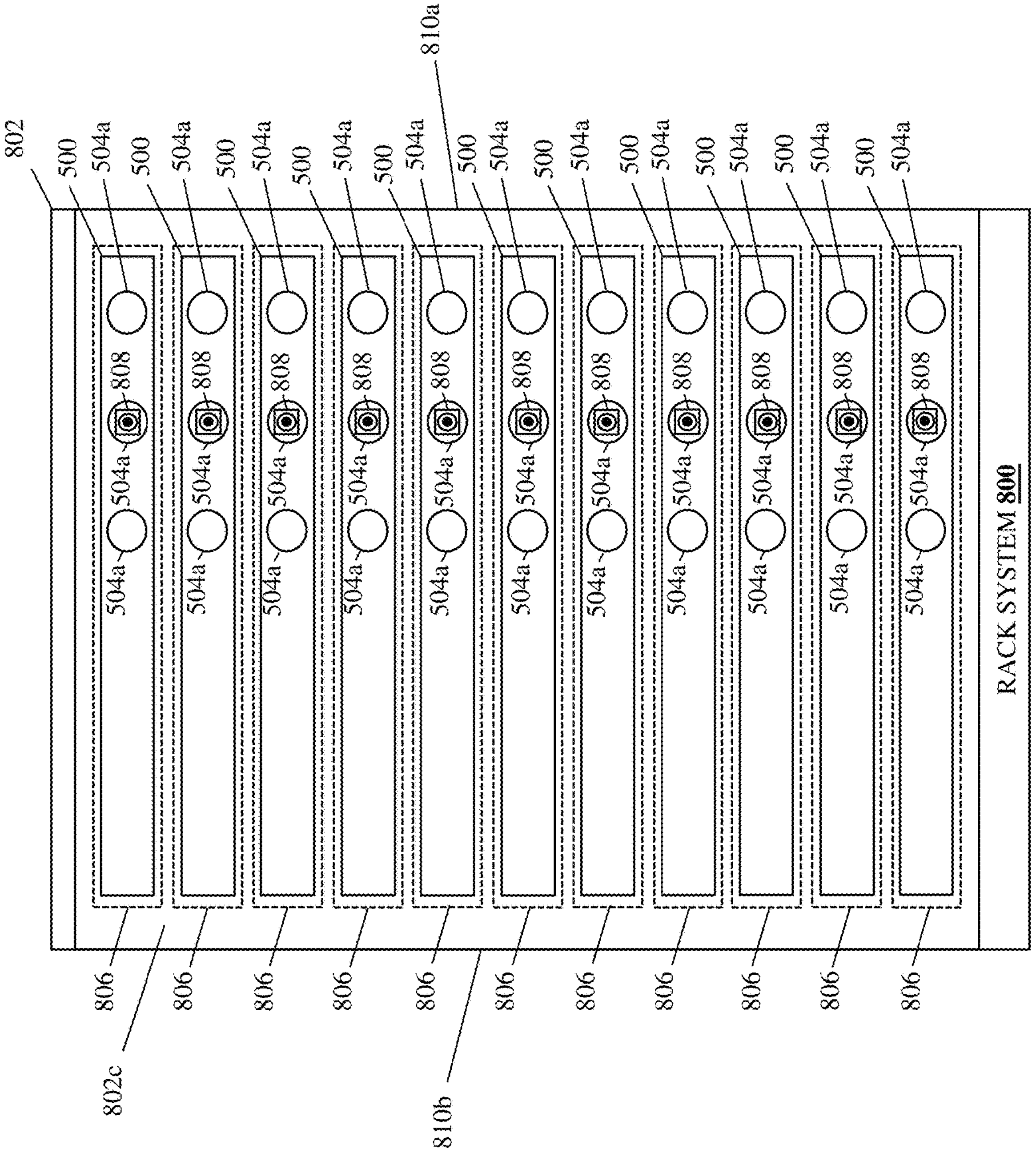
FIG. 9 is a schematic side cross-sectional view illustrating an embodiment of the rack system of FIGS. 8A and 8B including a plurality of the rack mounting subsystem of FIGS. 5A and 5B in the retracted orientation.

Referring now to FIG. 9, an embodiment of the rack system 800 of FIG. 8C is illustrated that provides a side cross-sectional view of the inner side wall 802*c*, with a respective computing device mounting subsystem 500 of FIGS. 5A and 5B providing each of the plurality of computing device mounting subsystems 804*a*. As discussed above, the first computing device mounting element 502 included in each computing device mounting subsystem 500 may be mounted to the side wall 802*c* of the rack system 800 adjacent a respective computing device housing 806, with the second computing device mounting element 504 in each computing device mounting subsystem 500 moveably coupled to the first computing device mounting element 502.

As can be seen in FIG. 9 and as discussed above with reference to FIGS. 5A and 5B, when the second computing device mounting element 504 on each computing device mounting subsystem 500 is provided in the retracted orientation, the plurality of apertures 504*a* and 502*a* on that computing device mounting subsystem 500 align to allow the camera device 808 provided adjacent its computing device housing 806 to have a line of sight through one of the pair of aligned apertures 504*a* and 502*a* that allows it to capture an image of a computing device identifier that may be provided on a computing device and that faces the side wall 802*c* when that computing device is positioned in that computing device housing 806.

While not illustrated or described in detail, one of skill in the art in possession of the present disclosure will appreciate how each computing device mounting subsystem 804*b* provided adjacent a computing device housing 806 on the side wall 802*d* of the rack system 800 of FIG. 8C may be provided by a respective computing device mounting subsystem 500 that operates similarly as described above. Similarly as described above, a plurality of camera devices may be located on the side wall 802*d* adjacent each computing device housing 806, and each of those camera devices 808 may be configured to capture an image (through the aligned apertures 504*a* and 502*a* when the second computing device mounting element 504 on the computing device mounting subsystem 500 is provided in the retracted orientation) of a computing device identifier that may be provided on a computing device and that faces the side wall 802*d* when that computing device is positioned in that computing device housing 806.

Figure 10:
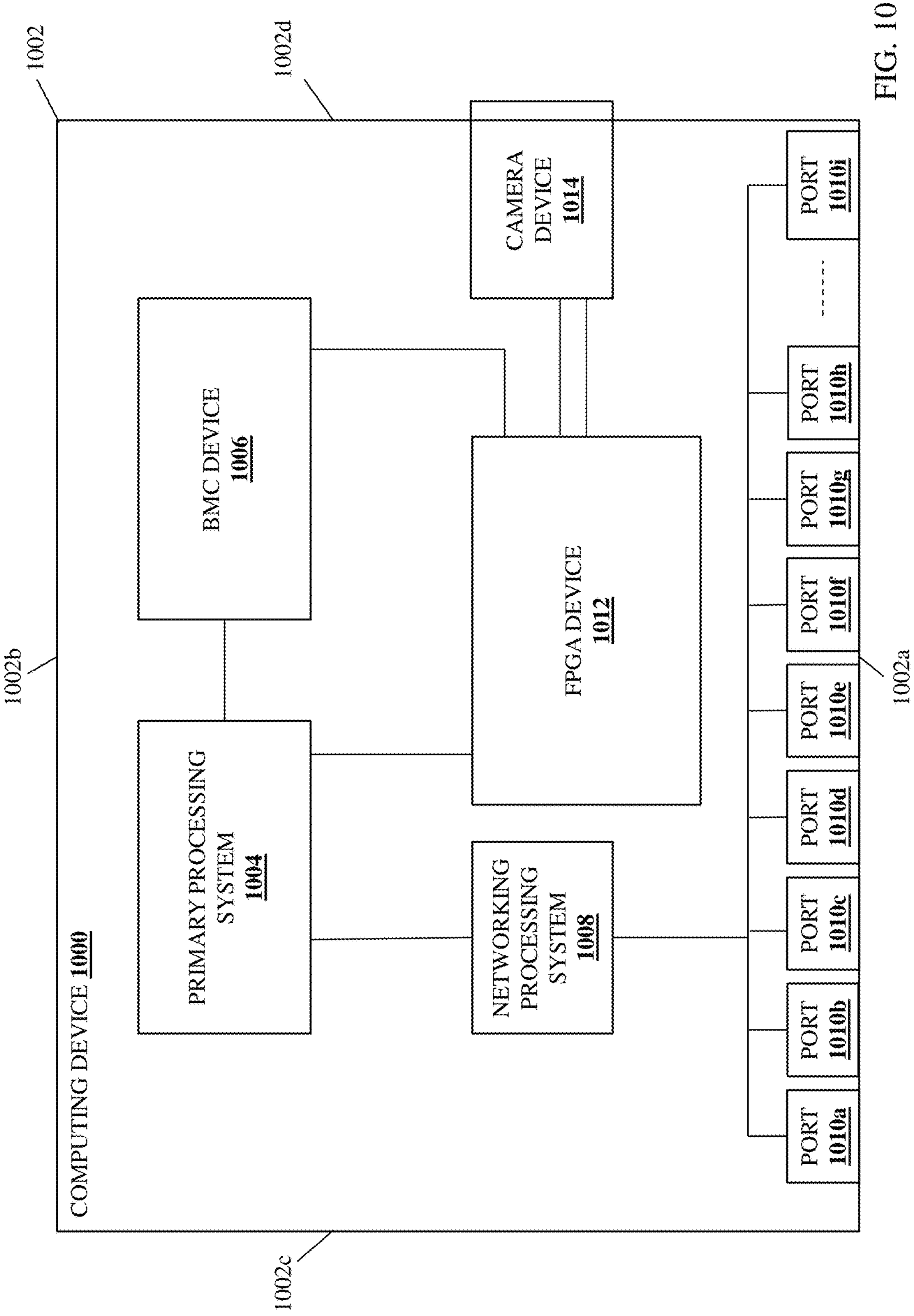
FIG. 10 is a schematic view illustrating an embodiment of a computing device that may be included in the computing device rack location identification system of the present disclosure.

Referring now to FIG. 10, an embodiment of a computing device 1000 is illustrated that may be included in the computing device location identification system of the present disclosure. As described below, the computing device 1000 includes a camera device that is configured to capture an image of at least one rack location identifier located on the rack systems 200/300/400 and adjacent its respective computing device housing when the computing device 1000 is positioned in that computing device housing. In an embodiment, the computing device 1000 may be provided by the IHS 100 discussed above with reference to FIG. 1 and/or may include some or all of the components of the IHS 100, and in specific embodiments may be provided by a networking device (e.g., a switch device). However, while described as being provided by a networking device, one of skill in the art in possession of the present disclosure will recognize that the functionality of the computing device 1000 discussed below may be provided by a server device, storage system, and or any of a variety of computing devices that are configured to operate similarly as the computing device 1000 discussed below.

In the illustrated embodiment, the computing device 1000 includes a chassis 1002 that houses the components of the computing device 1000, only some of which are illustrated and described below. The chassis 1002 includes a front wall 1002*a*, a rear wall 1002*b* that is located opposite the chassis 1002 from the front wall 1002*a*, and a pair of opposing side walls 1002*c* and 1002*d* that extend between the front wall 1002*a* and the rear wall 1002*b* and that are located opposite the chassis 1002 from each other. While not illustrated, one of skill in the art in possession of the present disclosure will appreciate how the chassis 1002 also includes a top wall and a bottom wall that each extends between the front wall 1002*a*, the real wall 1002*b*, and the side walls 1002*c* and 1002*d*, and that are located opposite the chassis 1002 from each other.

In the illustrated embodiment, the chassis 1002 houses a primary processing system 1004 (e.g., the processor 102 discussed above with reference to FIG. 1 such as, a Central Processing Unit (CPU)) that is coupled to a primary memory system (not illustrated, but which may include the memory 114 discussed above with reference to FIG. 1 such as, for example, Dynamic Random Access Memory (DRAM)) and that includes instructions that, when executed by the primary processing system, cause the primary processing system to provide any of the functionality of the computing device 1000 discussed below (e.g., the functionality described below as being provided by computing device rack location engines, computing device rack location reporting engines, computing device rack location tracking engines, and/or other computing device engines).

The chassis 1002 also houses a Baseboard Management Controller (BMC) device 1006 that is coupled to the primary processing system 1004. The BMC device 1006 may include a BMC processing system (e.g., not illustrated, but which may be similar to the processor 102 discussed above with reference to FIG. 1) that is coupled to a BMC memory system (not illustrated, but which may be similar to the memory 114 discussed above with reference to FIG. 1) that includes instructions that, when executed by the BMC processing system, cause the BMC processing system to provide any of the functionality of the computing device 1000 discussed below (e.g., the functionality described below as being provided by computing device rack location engines, computing device rack location reporting engines, computing device rack location tracking engines, and/or other computing device engines). In an embodiment, the BMC device 1006 may be provided by an integrated DELL® Remote Access Controller (iDRAC) provided in computing devices available from DELL® Inc. of Round Rock, Texas, United States. However, while a specific BMC device has been described, one of skill in the art in possession of the present disclosure will appreciate how other BMC devices will fall within the scope of the present disclosure as well.

The chassis 1002 also houses a networking processing system 1008 (e.g., a Network Processing Unit (NPU)) that is coupled to the primary processing system 1004. The networking processing system 1008 is also coupled to a networking memory system (not illustrated, but which may be similar to the memory 114 discussed above with reference to FIG. 1) that includes instructions that, when executed by the networking processing system 1008, cause the networking processing system 1008 to provide any of a variety of data plane/packet routing/networking functionality known in the art.

The chassis 1002 also houses a plurality of ports 1010*a*, 1010*b*, 1010*c*, 1010*d*, 1010*e*, 1010*f*, 1010*g*, 1010*h*, and up to 1010*i*, each of which are coupled to the networking processing system 1008, and each of which may be provided by any of a variety of networking ports (e.g., Quad Small Form-factor Pluggable (QSFP) ports, Ethernet ports, management ports, etc.) known in the art. In a specific example, the ports 1010*a*-1010*i* may be coupled to the networking processing system 1008 via Serializer/Deserializer (SERDES) circuits that are configured to provide high-speed data communications, although one of skill in the art in possession of the present disclosure will recognize how other port connections will fall within the scope of the present disclosure as well.

The chassis 1002 also houses a Field-Programmable Gate Array (FPGA) device 1012 that is coupled to the primary processing system 1004 and the BMC device 1006. The FPGA device 1012 may include an FPGA processing system (e.g., not illustrated, but which may be similar to the processor 102 discussed above with reference to FIG. 1) that is coupled to an FPGA memory system (not illustrated, but which may be similar to the memory 114 discussed above with reference to FIG. 1) that includes instructions that, when executed by the FPGA processing system, cause the FPGA processing system to provide any of the functionality of the computing device 1000 discussed below (e.g., the functionality described below as being provided by computing device rack location engines, computing device rack location reporting engines, computing device rack location tracking engines, and/or other computing device engines).

As discussed in further detail below, the computing device 1000 described below may include computing device rack location engines, computing device rack location reporting engines, computing device rack location tracking engines, and/or other computing device engines that provide the computing device rack location identification functionality of the present disclosure, and as discussed above, that functionality may be enabled by any or all of the primary processing system 1004, the BMC device 1006, and/or the FPGA device 1012. As such, while specific functionality is described below as being performed by each of the primary processing system 1004, the BMC device 1006, and/or the FPGA device 1012, one of skill in the art in possession of the present disclosure will recognize how different processing systems in the computing device may perform the computing device rack location identification functionality of the present disclosure while remaining within the scope as well.

The chassis 1002 also houses a camera device 1014 that is positioned adjacent the side wall 1002*d* of the chassis 1002 and, as discussed below, is configured to capture images of rack location identifiers that are located adjacent the side wall 1002*d*. As will be appreciated by one of skill in the art in possession of the present disclosure, the camera device 1014 on the computing device 1000 may require a standardized or known positioning on the computing device 1000 described herein in order to allow the camera device 1014 to capture an image of the rack location identifier(s) discussed above when the computing device 1000 is positioned in its adjacent computing device housing. As such, one of skill in the art in possession of the present disclosure will appreciate how the location of the camera device 1014 on the computing device 1000 may vary from that illustrated in FIG. 10.

In the illustrated embodiment, the camera device 1014 is coupled to the FPGA device 1012 by a plurality of couplings that one of skill in the art in possession of the present disclosure will appreciate may be provided by an Inter-Integrated Circuit (I2C) coupling that is configured to transmit camera device configuration and control data, as well as a Camera Serial Interface (CSI) coupling that is configured to transmit of high-speed image data. However, while a specific camera device has illustrated and described, one of skill in the art in possession of the present disclosure will appreciate how an additional camera device and/or camera devices in different locations (e.g., a camera device positioned adjacent the side wall 1002*c* that is configured to capture images of rack location identifiers that are located adjacent the side wall 1002*c*) will fall within the scope of the present disclosure as well.

Furthermore, while a specific computing device 1000 has been described, one of skill in the art in possession of the present disclosure will appreciate how computing devices included in the computing device rack location identification system of the present disclosure may include a variety of components and/or component configurations for providing conventional computing device functionality, as well as the computing device rack location identification functionality described below, while remaining within the scope of the present disclosure as well.

Figure 11A:
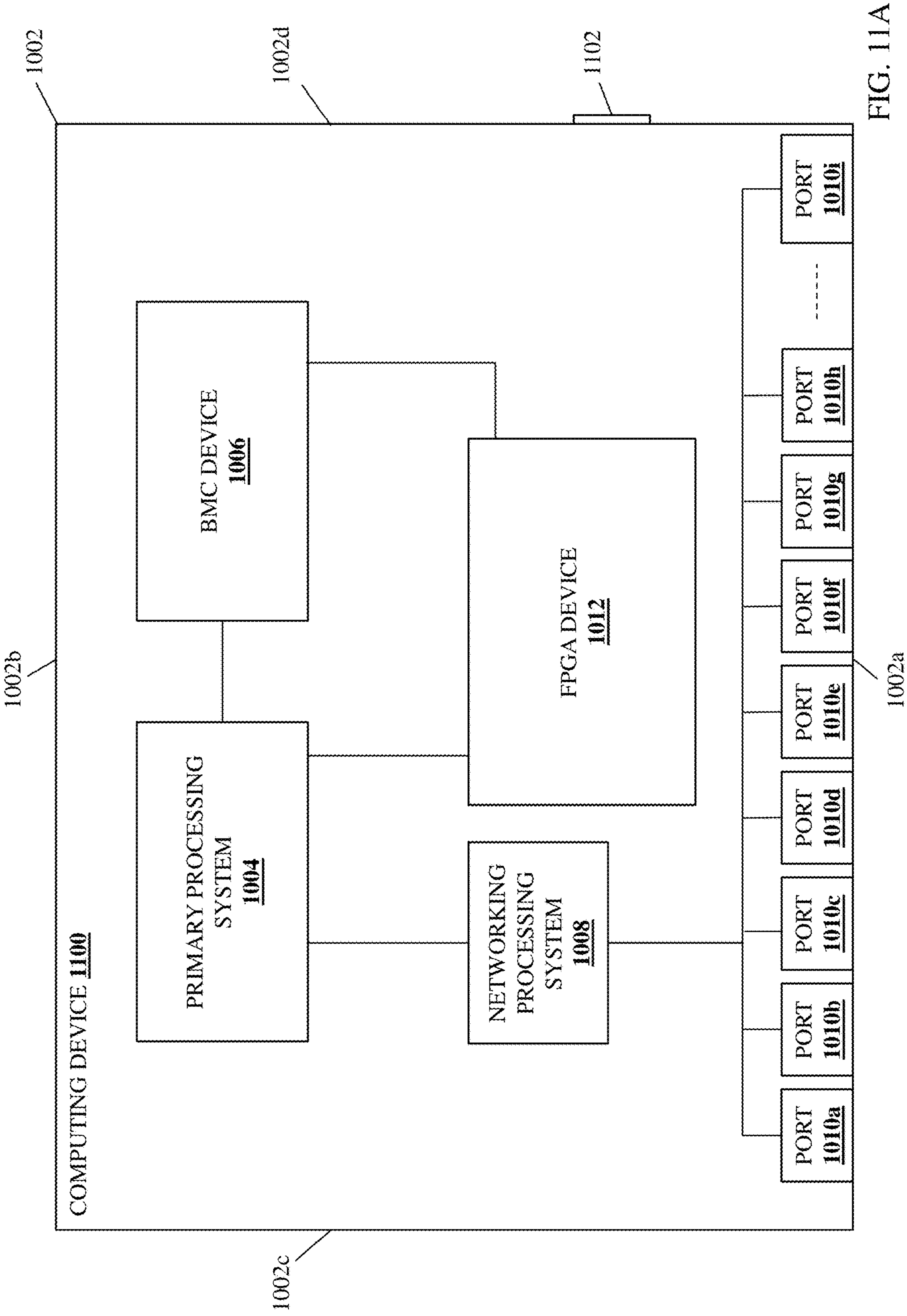
FIG. 11A is a schematic top view illustrating an embodiment of a computing device that may be included in the computing device rack location identification system of the present disclosure.
Figure 11B:
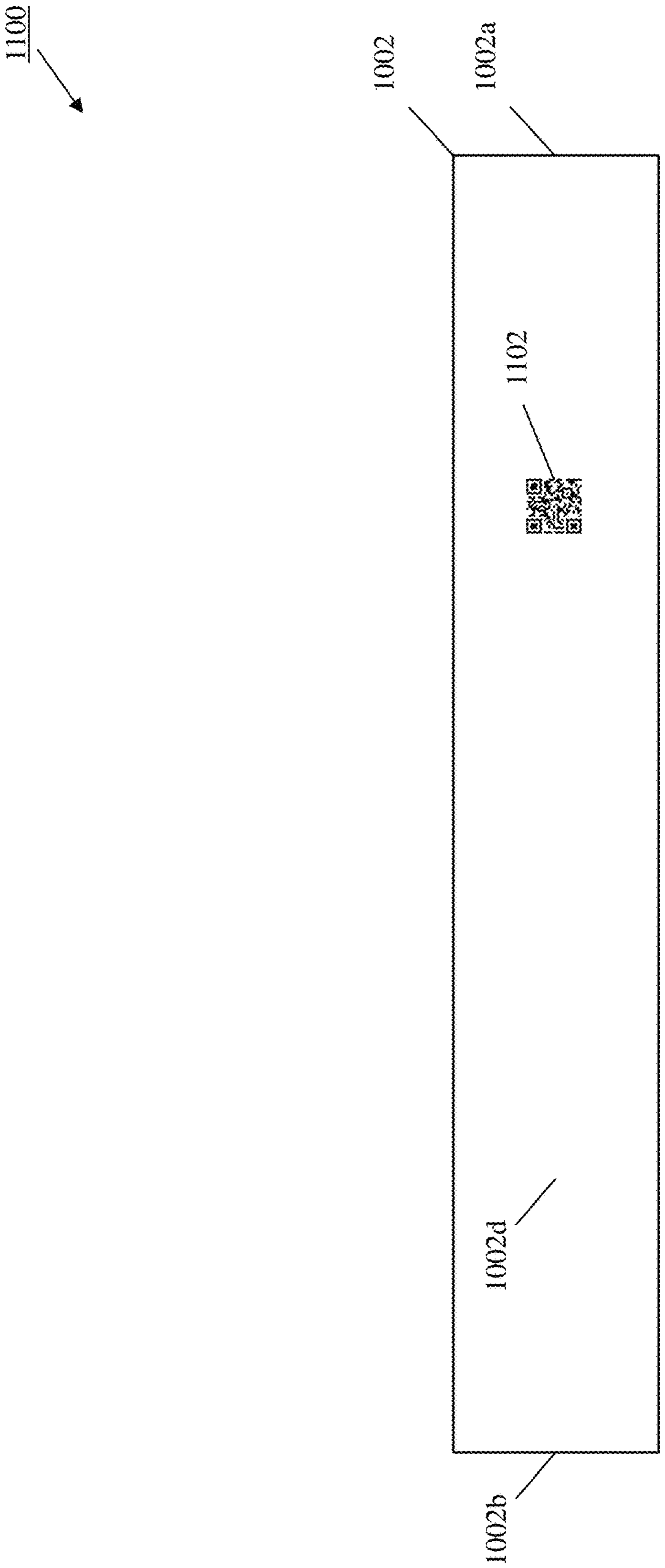
FIG. 11B is a schematic side view illustrating an embodiment of the computing device of FIG. 11A.

For example, referring now to FIGS. 11A and 11B, an embodiment of a computing device 1100 is illustrated that may provide the computing device location identification system of the present disclosure. As described below, the computing device 1100 includes a computing device identifier located on its outer surface, with a camera device on the rack system 800 configured to capture an image of that computing device identifier when the computing device 1100 is positioned in the computing device housing adjacent that camera device. In the illustrated embodiments, the computing device 1100 is substantially similar to the computing device 1000 discussed above with reference to FIG. 10, and thus similar elements have been provided with the same element numbers. However, in the embodiment illustrated in FIGS. 11A and 11B, the camera device 1014 has been omitted, and a single computing device identifier 1102 is included on an outer surface of the side wall 1002*d* on the chassis 1002.

In the embodiments discussed below, the computing device identifier 1102 is illustrated and described as being provided by a Quick Response (QR) code, but one of skill in the art in possession of the present disclosure will appreciate how the computing device identifier 1102 may be provided by Universal Product Codes (UPCs), Data Matrix bar codes, and/or other identification coding that may be captured as described below while remaining within the scope of the present disclosure as well. In an embodiment, the computing device identifier 1102 may include computing device identification information associated with the computing device 1100, and one of skill in the art in possession of the present disclosure will appreciate how that computing device identification information may include serial numbers, service tags, manufacturer/model information, and/or any other computing device identification information that would be apparent to one of skill in the art in possession of the present disclosure.

As will be appreciated by one of skill in the art in possession of the present disclosure, the computing device identifier 1102 on the computing device 1100 may require a standardized or known positioning of camera devices on the rack systems described herein in order to allow those camera devices to capture an image of the computing device identifier 1102 when the computing device 1100 is positioned in its adjacent computing device housing. As such, one of skill in the art in possession of the present disclosure will appreciate how the location of the computing device identifier on the computing device 1100 may vary from that illustrated in FIGS. 11A and 11B. Furthermore, while illustrated and described as being located on the side wall 1002*d* of the chassis 1002, one of skill in the art in possession of the present disclosure will appreciate how a computing device identifier may be provided at different locations on the chassis 1002 (e.g., on an outer surface of the side wall 1002*c*) in order to allow camera devices on the rack system 800 to capture its image.

Figure 12A:
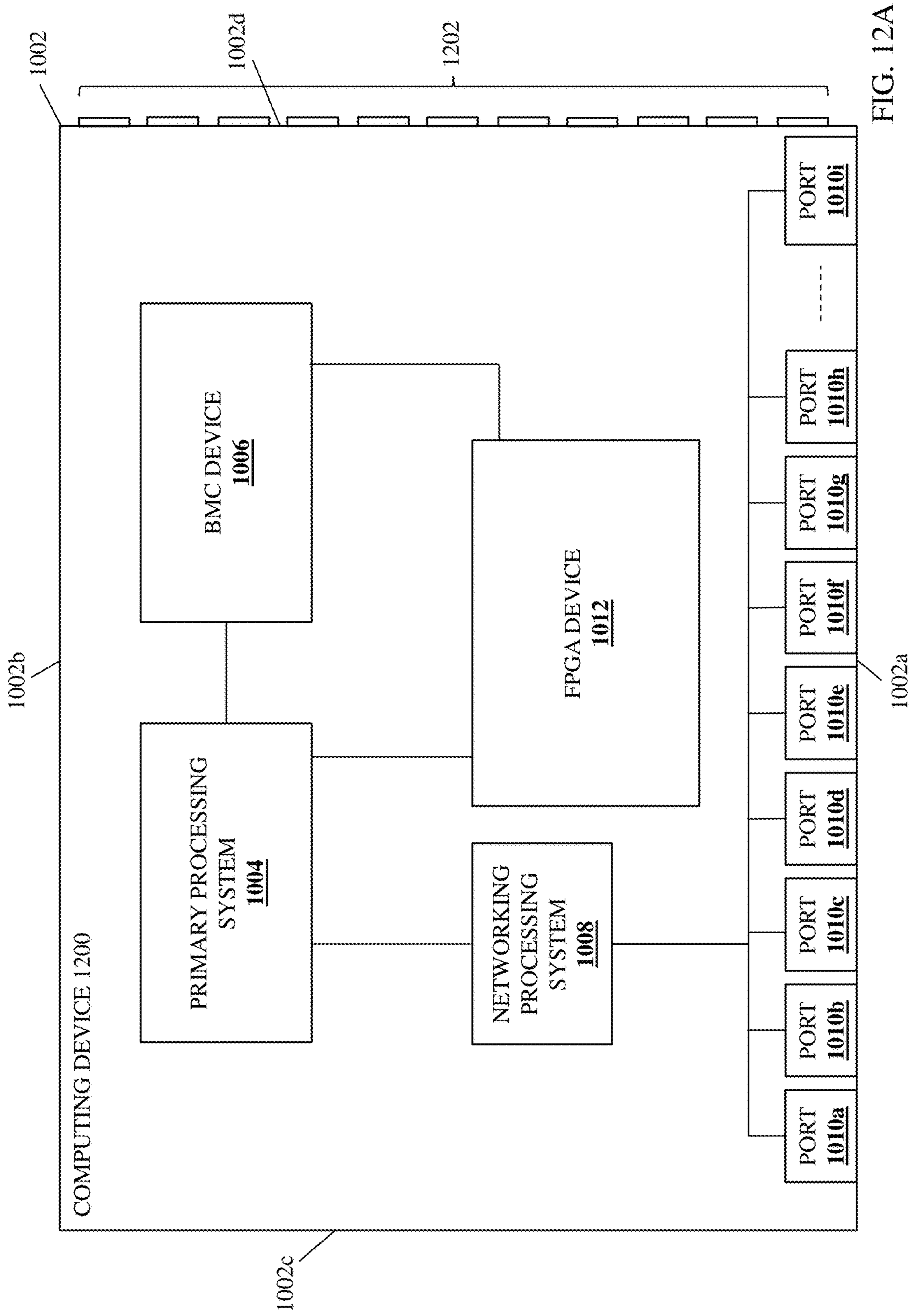
FIG. 12A is a schematic top view illustrating an embodiment of a computing device that may be included in the computing device rack location identification system of the present disclosure.
Figure 12B:
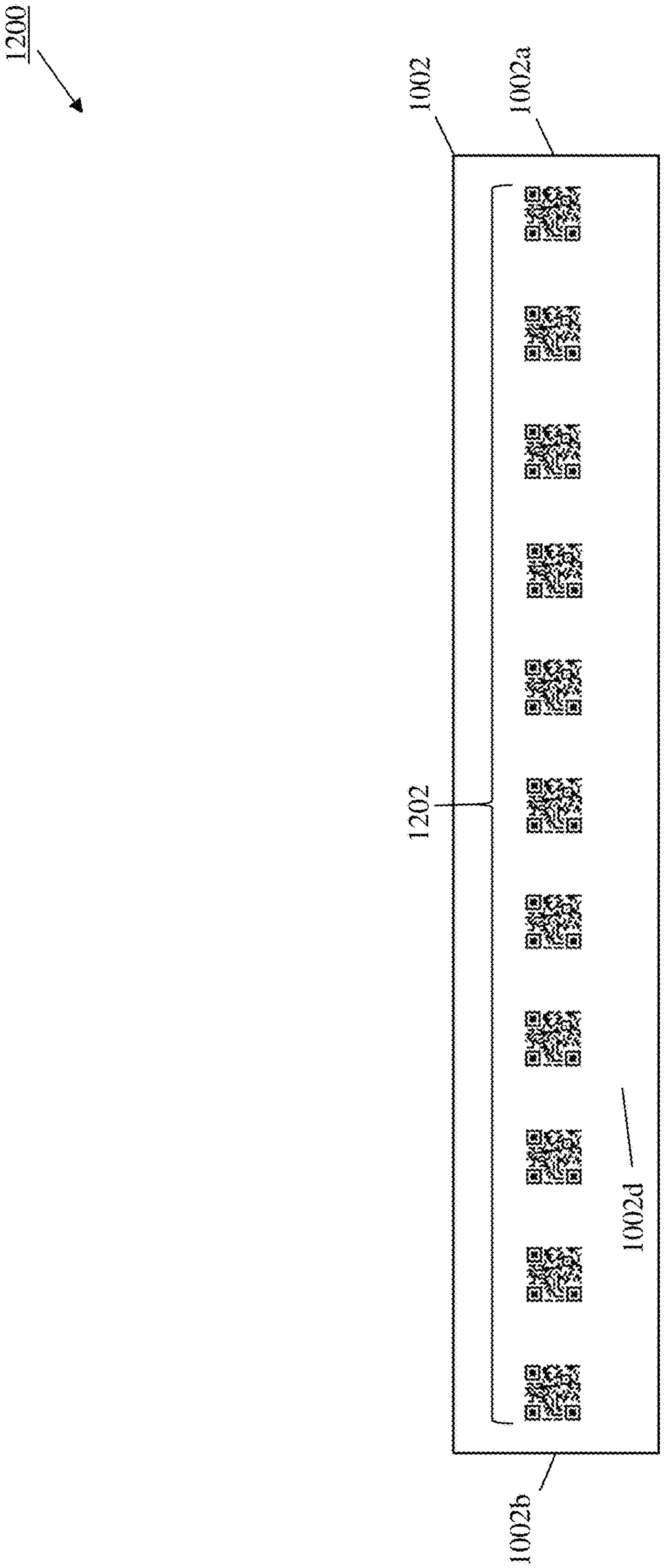
FIG. 12B is a schematic side view illustrating an embodiment of the computing device of FIG. 12A.

In another example, referring now to FIGS. 12A and 12B, an embodiment of a computing device 1200 is illustrated that may provide the computing device location identification system of the present disclosure. As described below, the computing device 1200 includes a plurality of computing device identifiers located on its outer surface, with a camera device on the rack system 800 configured to capture an image of any of those computing device identifiers when the computing device 1100 is positioned in the computing device housing adjacent that camera device, and one of skill in the art in possession of the present disclosure will appreciate how the computing device 1200 allows a variety of different camera device positionings on the rack system 800 to capture the image of any of the computing device identifiers provided on the computing device 1200. In the illustrated embodiments, the computing device 1200 is substantially similar to the computing device 1000 discussed above with reference to FIG. 10, and thus similar elements have been provided with the same element numbers. However, in the embodiment illustrated in FIGS. 12A and 12B, the camera device 1014 has been omitted, and a plurality of computing device identifiers 1202 are included on an outer surface of the side wall 1002*d* on the chassis 1002.

As will be appreciated by one of skill in the art in possession of the present disclosure, the plurality of computing device identifiers 1202 on the computing device 1200 may be provided in any number and/or relative positioning that will allow camera devices on the rack systems described herein to capture an image of at least one of those computing device identifiers 1202 when the computing device 1200 is positioned in its adjacent computing device housing. As such, one of skill in the art in possession of the present disclosure will appreciate how the number and/or relative locations of the computing device identifiers 1200 on the computing device 1200 may vary from that illustrated in FIGS. 12A and 12B. Furthermore, while illustrated and described as being located on the side wall 1002*d* of the chassis 1002, one of skill in the art in possession of the present disclosure will appreciate how computing device identifiers may be provided at different locations on the chassis 1002 (e.g., on an outer surface of the side wall 1002*c*) in order to allow camera devices on the rack system 800 to capture their image.

As such, while specific examples are provided herein and discussed below, the computing device rack location identification system of the present disclosure may include a variety of rack systems and computing device configurations that will enable the identification of computing devices in rack locations and that will fall within the scope of the present disclosure as well.

Referring now to FIG. 13, an embodiment of a method 1300 for identifying a rack location of a computing device in a rack is illustrated. As discussed below, the systems and methods of the present disclosure provide for the determination of the location of a computing device in a rack system. For example, the computing device location identification system of the present disclosure may include a rack system defining computing device housings and including respective rack location identifier(s) adjacent each of the computing device housings. A computing device may be positioned in any of the computing device housings, and a camera device in the computing device may capture an image of one of the respective rack location identifier(s) located adjacent that computing device housing. A computing device rack location reporting subsystem in the computing device receives the image captured by the camera device, and transmits image information associated with the image via a network to a computing device rack location tracking system. As such, the imprecise tracking of computing devices in conventional computing device location identification systems that often requires manual identification of computing devices is eliminated.

Figure 14:
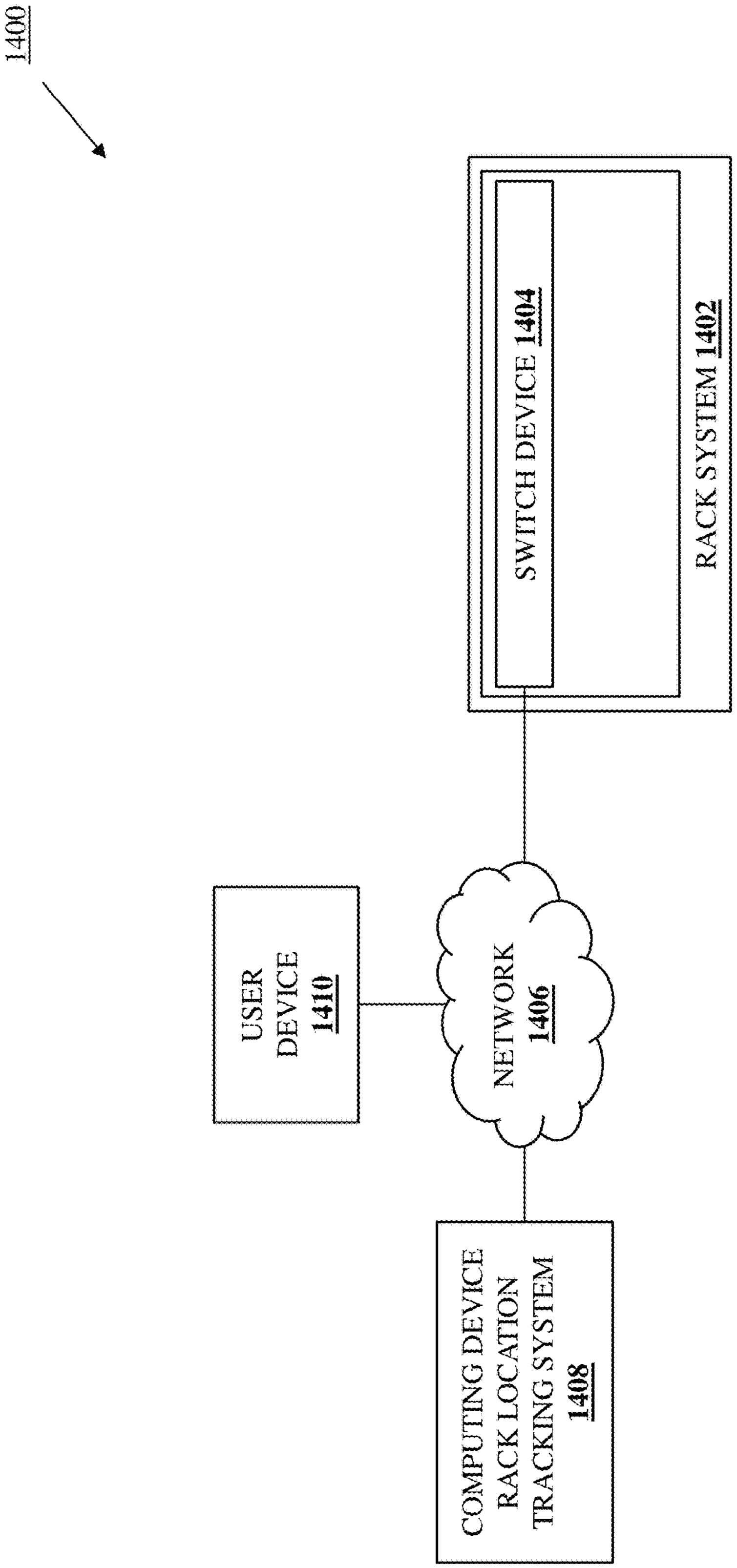
FIG. 14 is schematic view illustrating an embodiment of a networked system that may include the computing device rack location identification system of the present disclosure.

As will be appreciated by one of skill in the art in possession of the present disclosure, the computing device rack location identification system of the present disclosure may be provided in datacenters, server farms, and/or other locations where significant numbers of computing devices are utilized. With reference to FIG. 14, an embodiment of a networked system 1400 is illustrated that may include the computing device rack location identification system of the present disclosure. The networking system 1400 includes a rack system 1402 that may be provided by any of the rack systems 200, 300, and 400 discussed above.

As illustrated, a switch device 1404 may be positioned in any of the computing device housings that are included in the rack system 1402 as described above, and may be coupled to a network 1406 that may be provided by a Local Area Network (LAN), the Internet, combinations thereof, and/or any other networks that would be apparent to one of skill in the art in possession of the present disclosure. A computing device rack location tracking system 1408 is coupled to the network 1406 and, as described below, may be provided by one or more server devices that are configured to track the rack location of computing devices in rack systems like the rack system 1402 of FIG. 14.

A user device 1410 (e.g., a desktop computing device, a laptop/notebook computing device, a tablet computing device, a mobile phone, etc.) is coupled to the network 1406 and may be utilized to identify locations of computing devices in rack systems like the rack system 1402 of FIG. 14 via the computing device location tracking system 1408. However, while a specific example of a networked system 1400 that includes the computing device rack location identification system of the present disclosure has been illustrated and described, one of skill in the art in possession of the present disclosure will appreciate how the computing device rack location identification system may include a variety of components and/or component configurations while remaining within the scope of the present disclosure as well.

The method 1300 begins at block 1302 where a computing device is positioned in a computing device housing in a rack that includes respective rack location identifier(s) located adjacent the computing device housing. In the specific example below, the method 1300 is described using the computing device 1000 discussed above with reference to FIG. 10 and the rack system of FIGS. 3A and 3B, but one of skill in the art in possession of the present disclosure will appreciate how the method 1300 will operate substantially similarly using the rack system 400 of FIGS. 4A and 4B.

Figure 15A:
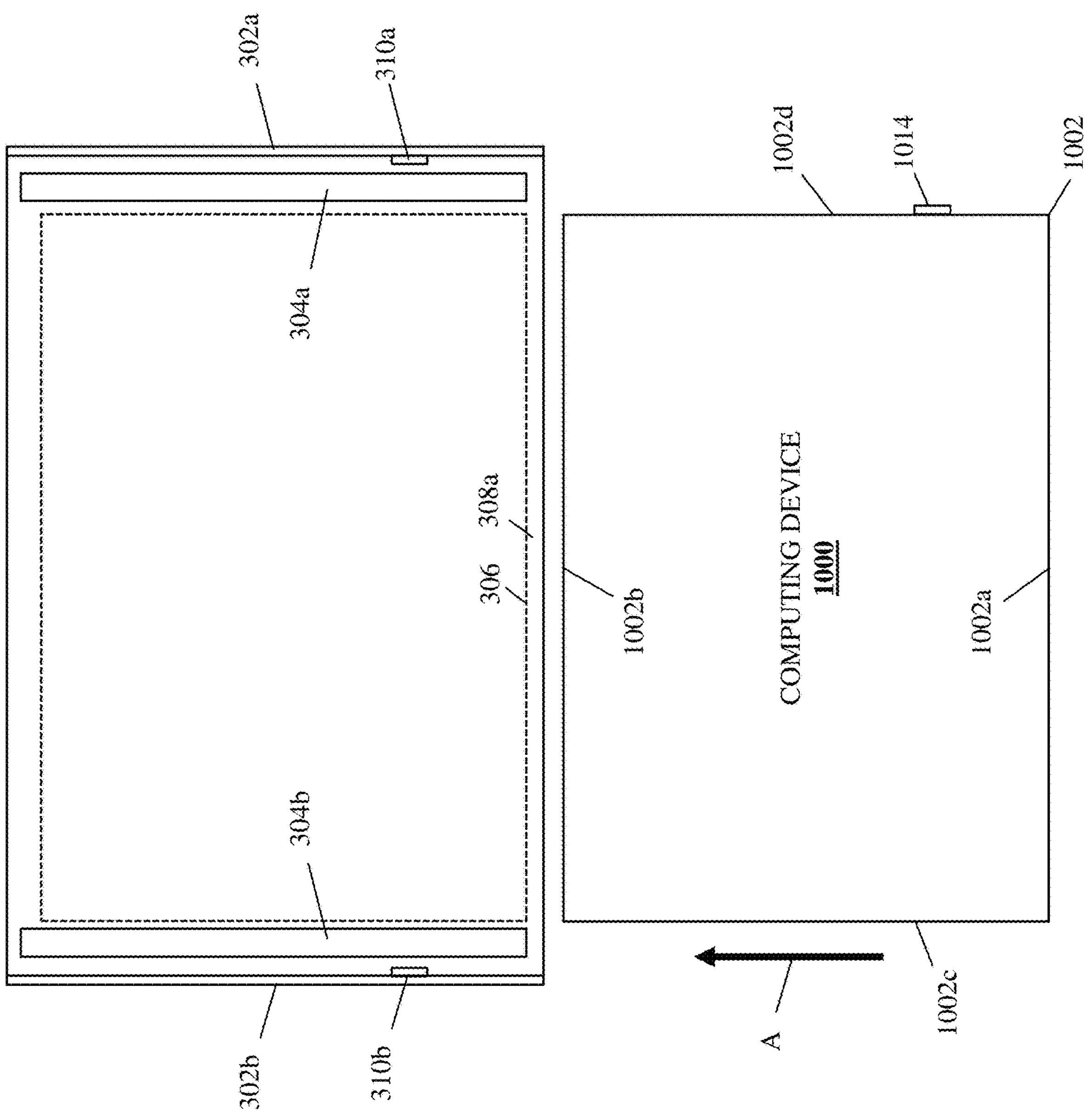
FIG. 15A is a schematic top view of the computing device of FIG. 10 being positioned in the rack system of FIGS. 3A and 3B during the method of FIG. 13.

As illustrated in FIG. 15A, in an embodiment of block 1302, the computing device 1000 may be positioned adjacent the rack entrance 308*a* such that the computing device 1000 is aligned with one of the computing device housings 306 on the rack system 300, and the rear wall 1002*b* of the chassis 1002 on the computing device 1000 is located immediately adjacent that computing device housing 306. While not illustrated or described in detail, one of skill in the art in possession of the present disclosure will appreciate that the computing device mounting subsystems 304*a* and 304*b* may be extended from the retracted orientation illustrated in FIG. 15A and connected to the chassis 1002 of the computing device 1000. For example, at block 1302 the computing device 1000 may be connected to the second computing device mounting element 504 on the computing device mounting subsystem 500 discussed above with reference to FIGS. 5A and 5B such that the camera device 1014 is located immediately adjacent one of the plurality of apertures 504*a*.

Figure 15B:
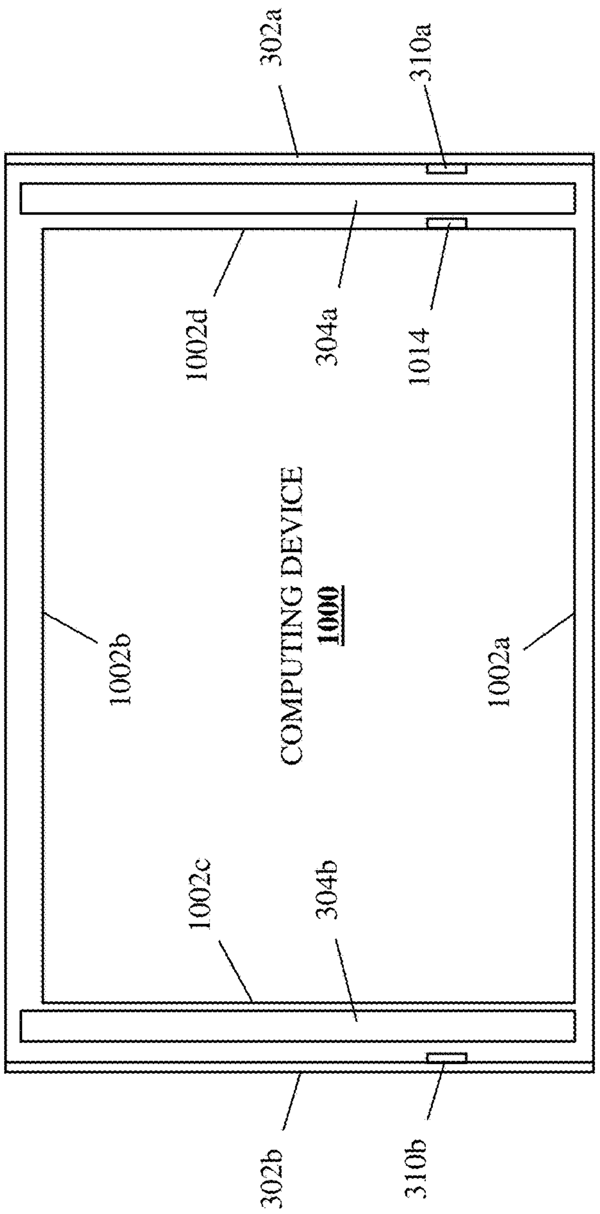
FIG. 15B is a schematic top view of the computing device of FIG. 10 positioned in the rack system of FIGS. 3A and 3B during the method of FIG. 13.

As illustrated in FIGS. 15A and 15B, the computing device 1000 may then be moved in a direction A (e.g., via the movement of the computing device mounting subsystems 304*a* and 304*b* into the retracted position illustrated in FIG. 15B) such that the computing device 1000 moves through the rack entrance 308*a* and into the computing device housing 306. As will be appreciated by one of skill in the art in possession of the present disclosure, the computing device 1000 may be considered to be "housed" in the computing device housing 306 when the chassis 1002 is entirely located in the computing device housing 306 as illustrated in FIG. 15B, and/or when the computing device mounting subsystems 304*a* and 304*b* are in the retracted orientation.

In the example illustrated in FIG. 15B, when the computing device 1000 is housed in the computing device housing 306, the camera device 1014 adjacent the side wall 1002*d* of the chassis may be configured to align with the rack location identifier 310*a* located on the side wall 302*a* of the rack system 300/200. For example, at block 1302, the computing device mounting subsystem 500 may be provided in the retracted orientation discussed above with reference to FIG. 5B such that the camera device 1014 on the computing device 1000 is located adjacent the aligned apertures 502*a* and 504*a* to provide the camera device 1014 with a line of sight to the rack location identifier 310*a*. Furthermore, one of skill in the art in possession of the present disclosure will appreciate how the camera device 1014 may be located on the side wall 1002*c* of the chassis 1002 such that it is configured to align with the rack location identifier 310*b* located on the side wall 302*b* of the rack system 300/200 when the computing device 1000 is housed in the computing device housing 306 while remaining within the scope of the present disclosure as well.

However, while the specific example provided herein describes the camera device 1014 aligning with the rack location identifier 310*a* on the rack system 300 when the computing device 1000 is housed in the computing device housing 306 in order to allow the camera device 1014 to capture an image of that rack location identifier 310*a* as described below, one of skill in the art in possession of the present disclosure will appreciate how the camera device 1014 may be configured to move past the rack location identifier 310*a* on the rack system 300 as the computing device 1000 is being housed in the computing device housing 306 while capturing an image of that rack location identifier 310*a* while remaining within the scope of the present disclosure as well.

As discussed above, the computing device 1000 may be positioned in the rack system 400 similarly as described above for the rack system 300, and one of skill in the art in possession of the present disclosure will recognize that the camera device 1014 may be configured to align with one of the plurality of rack location identifiers 410*a* one the rack system 300 when the computing device 1000 is housed in the computing device housing 406 in order to capture an image of that rack location identifier(s) 410*a*, or may be configured to move past any of the plurality of rack location identifiers 410*a* on the rack system 400 as the computing device 1000 is being housed in the computing device housing 406 while capturing an image of any of those rack location identifiers 410*a* while remaining within the scope of the present disclosure as well. However, while specific examples have been provided of positioning a computing device in a computing device housing of a rack system in the computing device rack location identification system of the present disclosure, one of skill in the art in possession of the present disclosure will appreciate how computing devices may be positioned in computing device housings in rack systems in a variety of manners while remaining within the scope of the present disclosure as well.

Figure 15C:
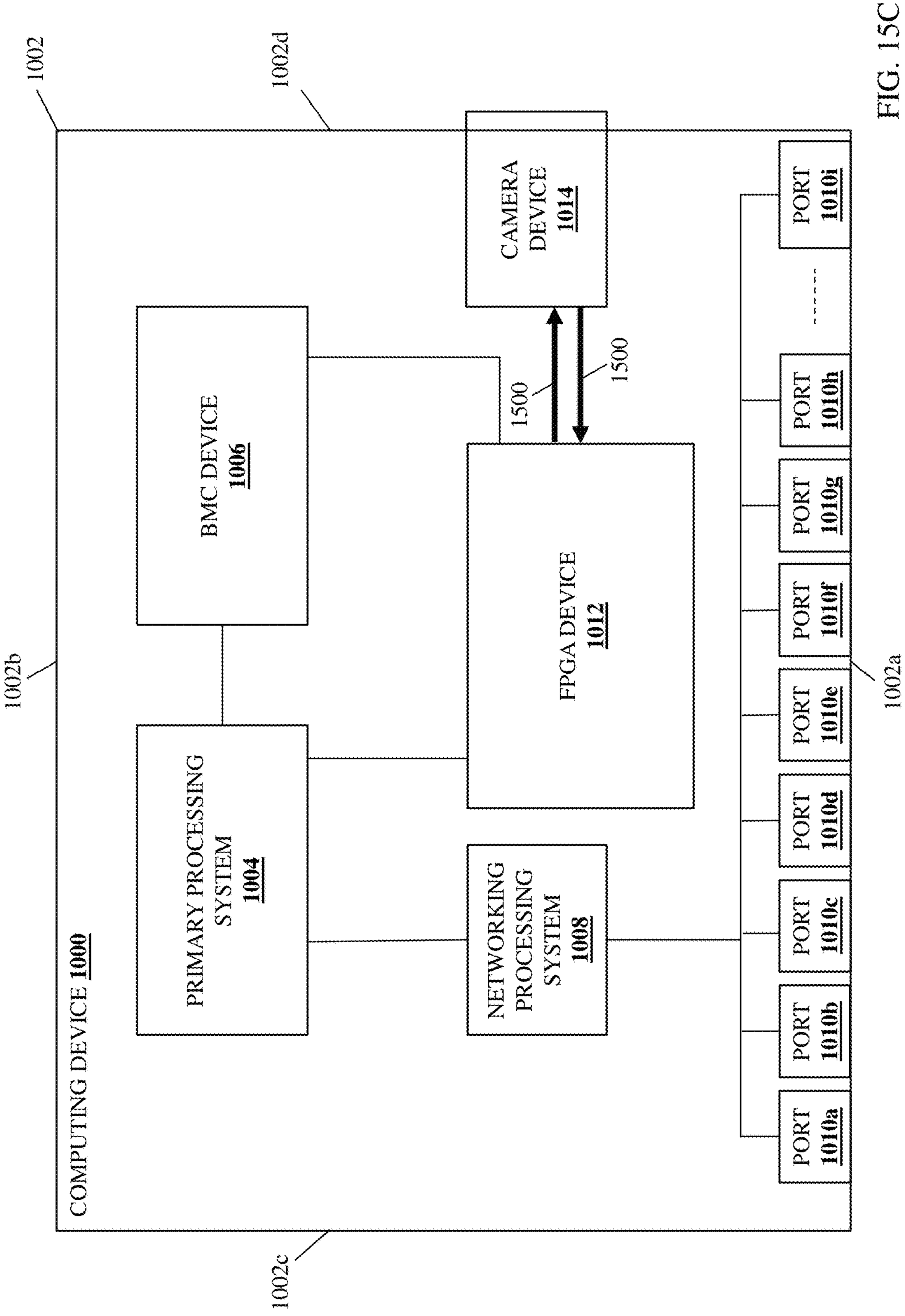
FIG. 15C is a schematic view of the computing device of FIG. 10 operating during the method of FIG. 13.
Figure 15D:
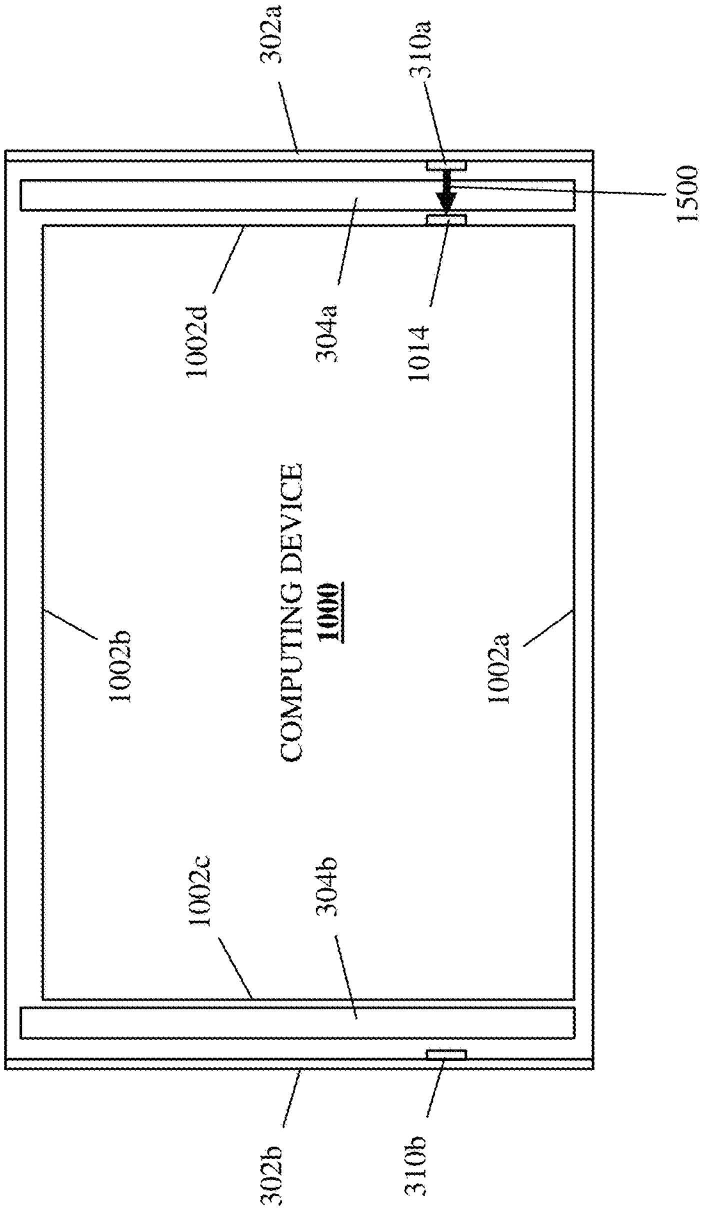
FIG. 15D is a schematic top view of the computing device of FIG. 10 positioned in the rack system of FIGS. 3A and 3B with a camera device on the computing device operating during the method of FIG. 13.

The method 1300 then proceeds to block 1304 where a camera device in a computing device captures an image of a rack location identifier located adjacent its computing device housing. With reference to FIGS. 15C and 15D, in an embodiment of block 1304, the FPGA device 1012 and the camera device 1014 in the computing device 1000 may perform image capture operations 1500 that may include the FPGA device 1012 controlling the camera device 1014 (e.g., via the I2C coupling described above) to capture an image of the rack location identifier 310*a* and transmit image data back to the FPGA device 1012 (e.g., via the CSI coupling described above), and as described above the camera device 1014 may be used to capture an image of the rack location identifier 310*a* once the camera device 1014 is aligned with that rack location identifier 310*a*, or as the camera device 1014 moves past that rack location identifier 310*a*. Similarly as described above, one of skill in the art in possession of the present disclosure will appreciate how the camera device 1014 may be located on the side wall 1002*c* of the chassis 1002 and may be used to capture an image of the rack location identifier 310*b* located on the side wall 302*b* of the rack system 300/200 in a similar manner as well.

Furthermore, one of skill in the art in possession of the present disclosure will recognize how the camera device 1014 may be used to capture an image of one of the plurality of rack location identifiers 410*a* on the rack system 400 once the camera device 1014 is aligned with that rack location identifier(s) 410*a*, or as the camera device 1014 moves past one of those rack location identifiers 410*a* as well. However, while specific examples of the capturing of an image of rack location identifiers have been described, one of skill in the art in possession of the present disclosure will appreciate how images of rack location identifiers may be captured in a variety of manners while remaining with the scope of the present disclosure as well.

Figure 15E:
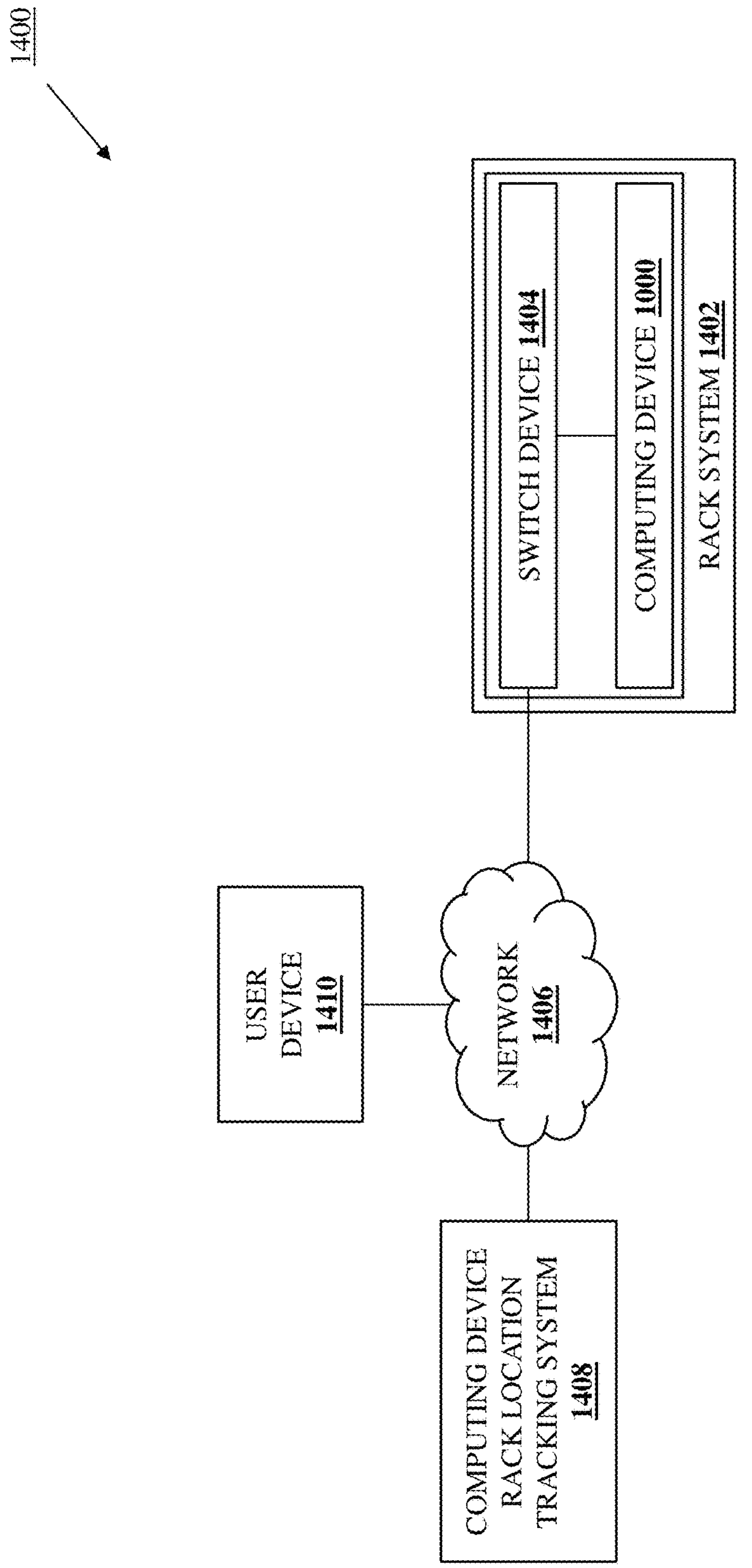
FIG. 15E is a schematic view of the computing device of FIG. 10 provided in the networked system of FIG. 14 during the method of FIG. 13.

As illustrated in FIG. 15E, once positioned in the rack system 1402, the computing device 1000 may be coupled to network 1406 (e.g., via the switch device 1404 in the example illustrated in FIG. 15E) using wired couplings, wireless couplings and/or any of a variety of computing device/switch device coupling techniques that would be apparent to one of skill in the art in possession of the present disclosure.

Figure 15F:
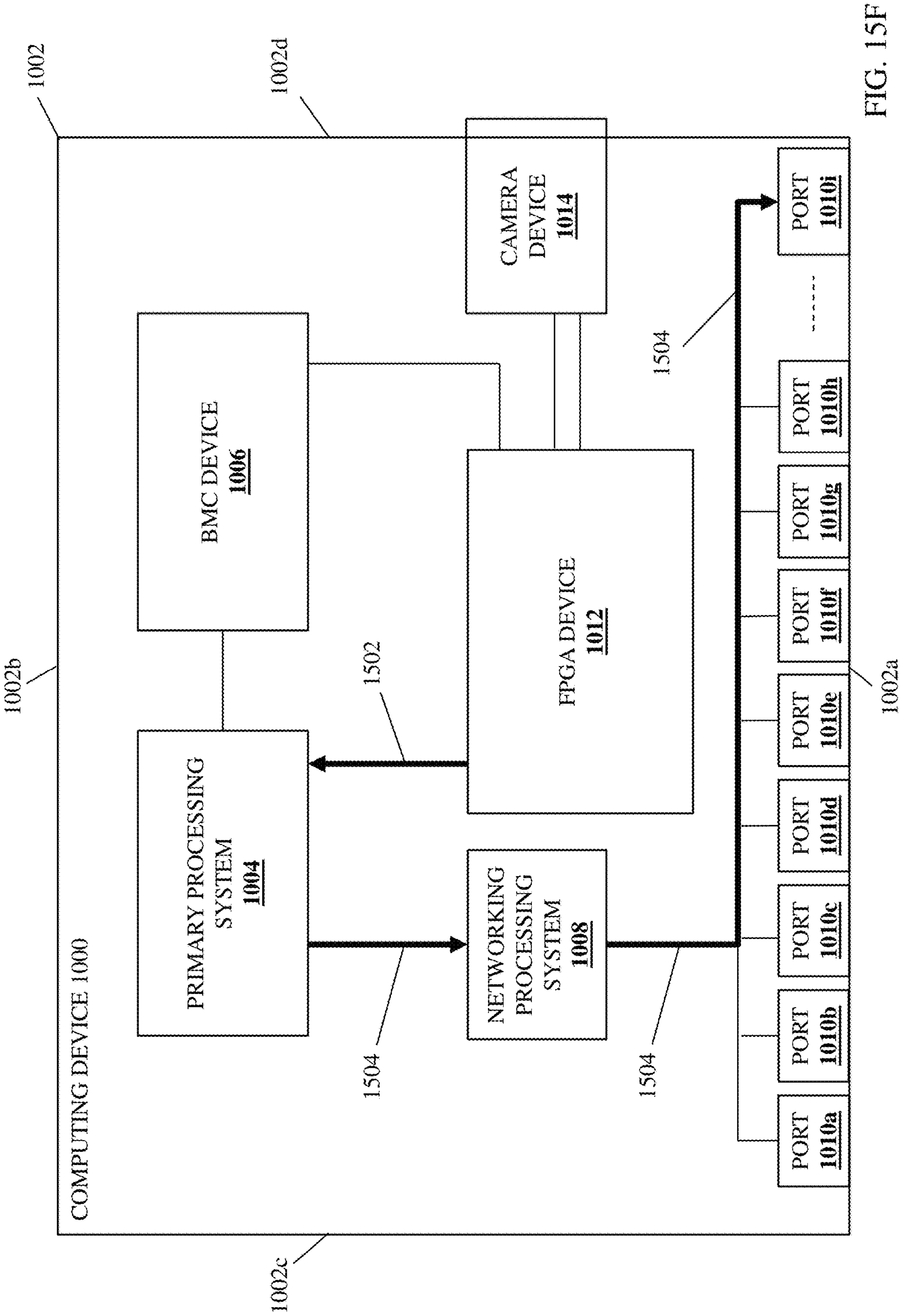
FIG. 15F is a schematic view of the computing device of FIG. 10 operating during the method of FIG. 13.

The method 1300 then proceeds to block 1306 where a computing device rack location reporting subsystem in the computing device receives an image of the rack location identifier captured by the camera device. With reference to FIG. 15F, in a specific example of block 1306, the FPGA device 1012 in the computing device 1000 may perform image data provisioning operations 1502 that may include transmitting the image data captured using the camera device 1014 to the primary processing system 1004, which provides the computing device rack location reporting subsystem in this example.

In some examples, in response to receiving the image data from the FPGA device 1012, the primary processing system 1004 may decode the information contained in the image data for the rack location identifier (e.g., information encoded in the QR code, UPC code, etc.) in order to retrieve image information associated with the image of the rack location identifier 310*a*, which as discussed above may include or may be associated with a rack system identifier for the rack system 300/1402 (e.g., a rack serial number), a rack unit location/position (e.g., an identifier for the computing device housing 306 in the rack system 300 in which the computing device was positioned), a datacenter location identifying a datacenter in which the rack system 300/1402 is located, and/or any other information that would be apparent to one of skill in the art in possession of the present disclosure. However, in other examples, the image data (e.g., the image information associated with the image of the rack location identifier 310*a*) received by the primary processing system 1004 from the FPGA device 1012 may be provided to the computing device rack location tracking system 1408, and as discussed below the computing device rack location tracking system 1408 may be configured to decode that image data similarly as described above by the primary processing system 1004.

While not illustrated or described in detail, in another example, the FPGA device 1012 in the computing device 1000 may perform the image data provisioning operations discussed above by transmitting the image data captured using the camera device 1014 to the BMC device 1006, which provides the computing device rack location reporting subsystem in this example. Similarly as described above, in some examples and in response to receiving the image data from the FPGA device 1012, the BMC device 1006 may decode the information contained in the image data for the rack location identifier (e.g., information encoded in the QR code, UPC code, etc.), which as discussed above may include or may be associated with a rack system identifier for the rack system 300/1402 (e.g., a rack serial number), a rack unit location/position (e.g., an identifier for the computing device housing 306 in the rack system 300 in which the computing device was positioned), a datacenter location identifying a datacenter in which the rack system 300/1402 is located, and/or any other information that would be apparent to one of skill in the art in possession of the present disclosure.

In other examples, the image data (e.g., the image information associated with the image of the rack location identifier 310*a*) received by the BMC device 1006 from the FPGA device 1012 may be provided to the computing device rack location tracking system 1408, and as discussed below the computing device rack location tracking system 1408 may be configured to decode the image data similarly as described above for the primary processing system 1004. However, while specific examples of providing the image of the rack location identifier to the computing device rack location reporting subsystem of the present disclosure have been illustrated and discussed, one of skill in the art will appreciate how the image of the rack location identifier may be provided to the computing device rack location reporting subsystem in a variety of manners while remaining within the scope of the present disclosure as well.

Figure 15G:
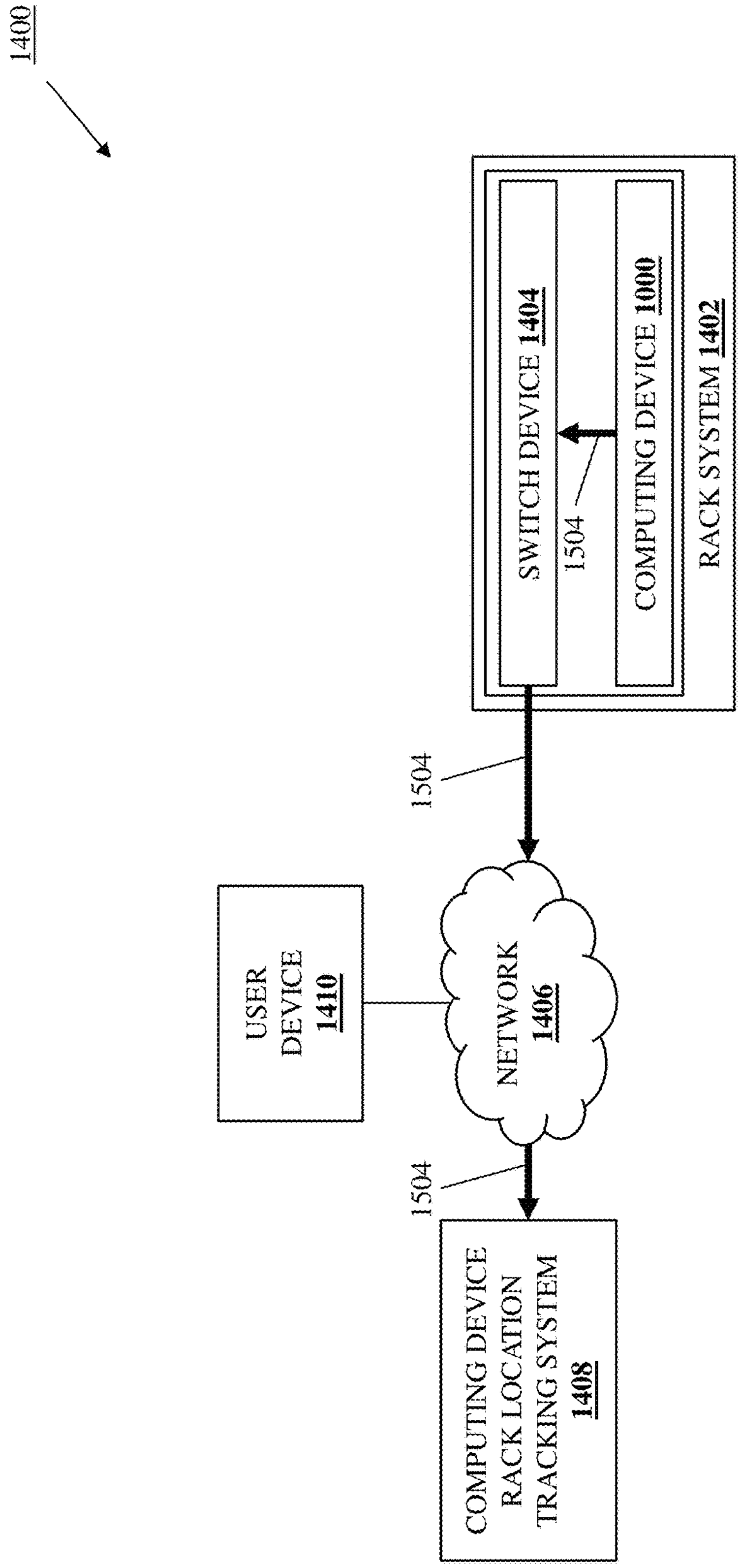
FIG. 15G is a schematic view of the networked system of FIG. 15D operating during the method of FIG. 13.

The method 1300 then proceeds to block 1308 where the computing device rack location reporting subsystem transmits image information associated with the image via a network to a computing device rack location tracking subsystem. With reference to FIGS. 15F and 15G, in an embodiment of block 1308 and following the coupling of the computing device 1000 to the network 1406, the computing device rack location reporting subsystem provided by the primary processing system 1004 may perform image information transmission operations 1504 which may include transmitting the image information associated with the image via the networking processing system 1008, the port 1010*i*, the switch device 1404, and the network 1406 to the computing device rack location tracking system 1408.

Furthermore, while not illustrated or described in detail, one of skill in the art in possession of the present disclosure will appreciate how the computing device rack location reporting subsystem provided by the BMC device 1006 may perform similar image information transmission operations to transmit the image information to the computing device rack location tracking system 1408. However, while a specific example of transmitting image information to a computing device rack location tracking system has been illustrated and described, one of skill in the art in possession of the present disclosure will appreciate how the image information may be transmitted to the computing device rack location tracking system in a variety of manners while remaining within the scope of the present disclosure as well.

In response to receiving the image information, the computing device rack location tracking system 1408 may store that information in a computing device rack location tracking database that is accessible to the computing device rack location tracking system 1408. For example, in embodiments in which the computing device 1000 decoded the image data captured of the rack location identifier 310*a* and transmitted that image information to the computing device rack location tracking system 1408, the computing device rack location tracking system 1408 may store that image information in the computing device rack location tracking database as a location of the computing device 1000 (e.g., as an entry in the computing device rack location tracking database identifying the computing device 1000; the datacenter, rack system 300/1402, and computing device housing 306 in which the computing device is located; and/or any other computing device location information that would be apparent to one of skill in the art in possession of the present disclosure).

As discussed above, in some embodiments, the image information received by the computing device rack location tracking system 1408 may identify the rack location identifier from which it was captured, with the identity of that rack location identifier associated in a database of the computing device rack location tracking system 1408 with the datacenter, rack system 300/1402, and computing device housing 306 adjacent that rack location identifier such that the computing device rack location tracking system 1408 may associate the datacenter, rack system 300/1402, and computing device housing 306 adjacent that rack location identifier with the computing device 1000 at block 1308.

In another example, the embodiments in which the computing device rack location tracking system 1408 receives the image data captured of the rack location identifier 310*a* by the computing device 1000 as the image information, the computing device rack location tracking system 1408 may decode that image data similarly as the computing device 1000 described above, and store the result in the computing device rack location tracking database as a location of the computing device 1000 (e.g., as an entry in the computing device rack location tracking database identifying the computing device 1000; the datacenter, rack system 300/1402, and computing device housing 306 in which the computing device is located; and/or any other computing device location information that would be apparent to one of skill in the art in possession of the present disclosure).

Similarly as discussed above, in some embodiments, the image received by the computing device rack location tracking system 1408 may be of the rack location identifier, with the information encoded in that rack location identifier associated in a database of the computing device rack location tracking system 1408 with the datacenter, rack system 300/1402, and computing device housing 306 adjacent that rack location identifier such that the computing device rack location tracking system 1408 may decode the image and associate the datacenter, rack system 300/1402, and computing device housing 306 adjacent that rack location identifier encoded therein with the computing device 1000 at block 1308.

Figure 15H:
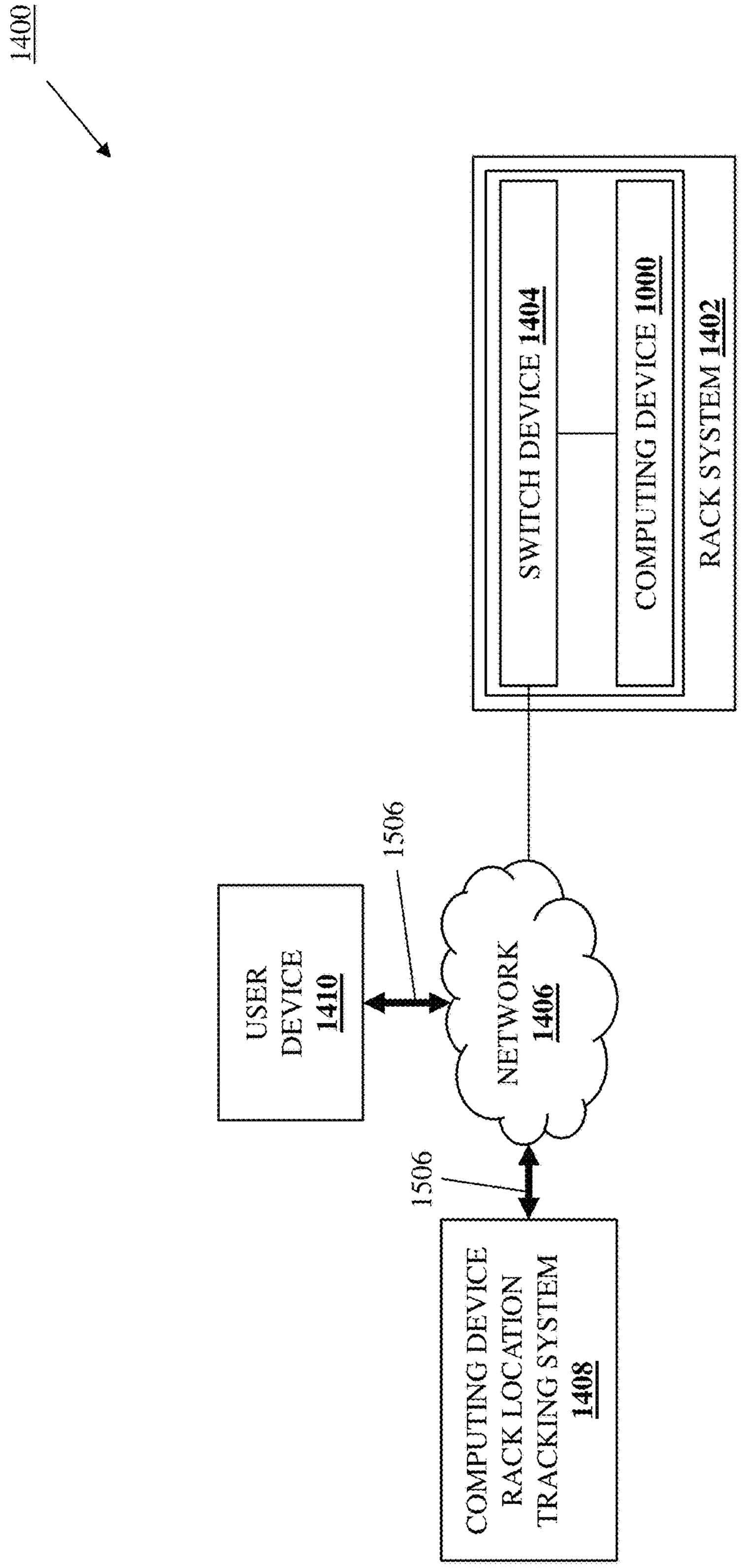
FIG. 15H is a schematic view of the networked system of FIG. 15D operating during the method of FIG. 13.

As such, one of skill in the art in possession of the present disclosure will appreciate how the computing device rack location tracking system 1408 may populate the computing device rack location tracking database with entries identifying the locations of a plurality of computing devices similarly as described above for the computing device 1000. Furthermore, any user wishing to identify the location of any of those computing devices may request that location from the computing device rack location tracking system. For example, with reference to FIG. 15H, the user device 1410 and the computing device rack location tracking system 1408 may perform computing device rack location identification operations 1506 that may include the user device 1410 requesting the location of a computing device from the computing device rack location tracking system 1408 (e.g., by identifying that computing device using a "service tag", serial number, or other computing device identifier known in the art), the computing device rack location tracking system 1408 identifying the location of that computing device (e.g., by using the computing device identifier to identify the entry in the computing device rack location tracking database for that computing device and identifying the datacenter, the rack system, and computing device housing in which that computing device is located), and the computing device rack location tracking system 1408 transmitting the location of that computing device to the user device 1410 for display. As such, the user of the user device 1410 may retrieve the location of any computing device whose location is tracked in the computing device rack location tracking system 1408.

Figure 16:
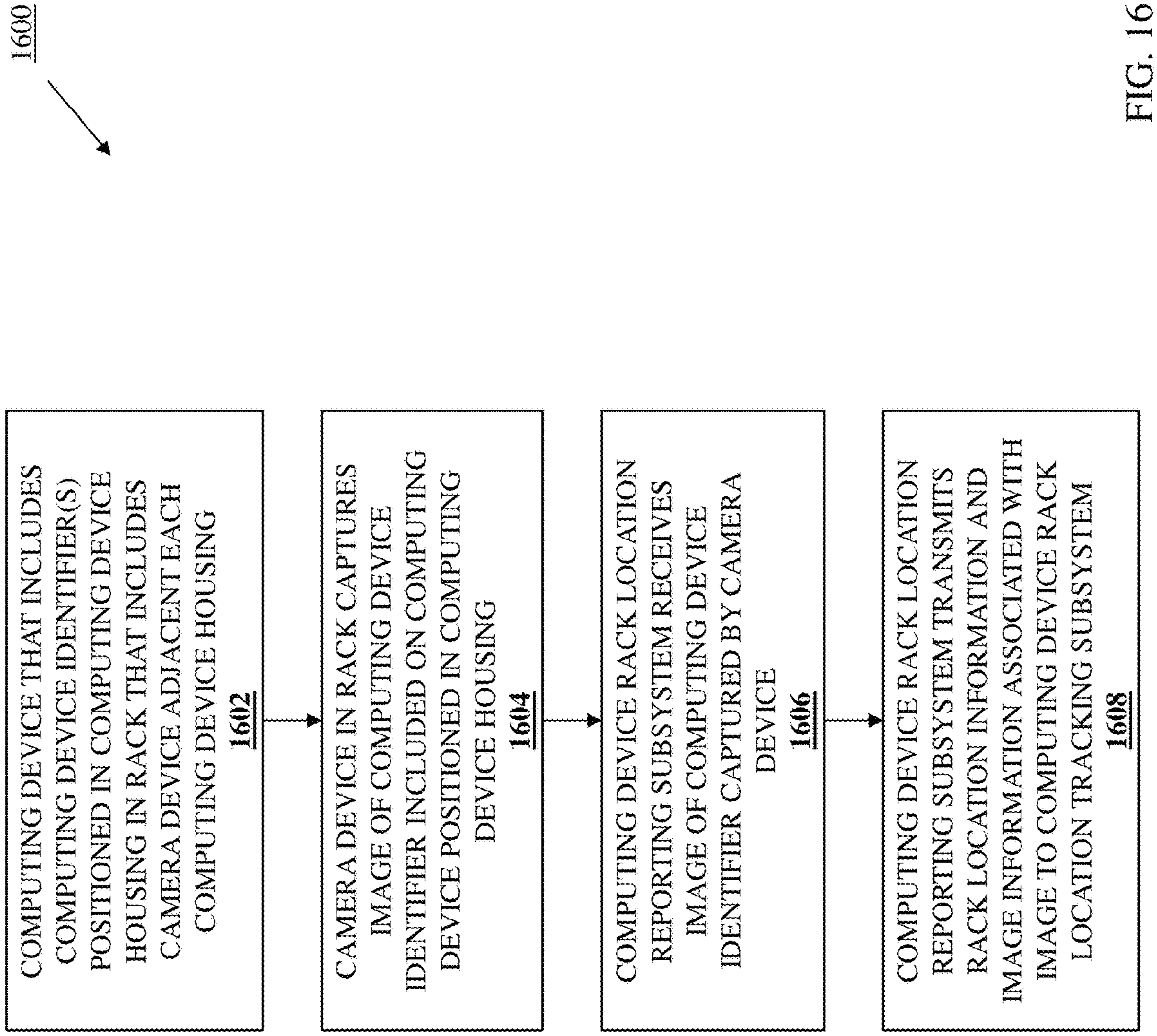
FIG. 16 is a flow chart illustrating an embodiment of a method for identifying a rack location of a computing device in a rack system.

Referring now to FIG. 16, an embodiment of a method 1600 for identifying a rack location of a computing device in a rack is illustrated. As discussed below, the systems and methods of the present disclosure provide for the determination of the location of a computing device in a rack system. For example, the computing device location identification system of the present disclosure may include a rack system defining computing device housings and that includes at least one camera device located adjacent each computing device housing. A computing device that includes a computing device identifier may be positioned in any of the computing device housings, and a camera device located adjacent that computing device housing in the rack may capture an image of that computing device identifier. A computing device rack location reporting subsystem included in the rack system receives the image captured by the camera device, and transmits image information associated with the image via a network to a computing device rack location tracking system. As such, the imprecise tracking of computing devices in conventional computing device location identification systems that often requires manual identification of computing devices is eliminated.

Figure 17:
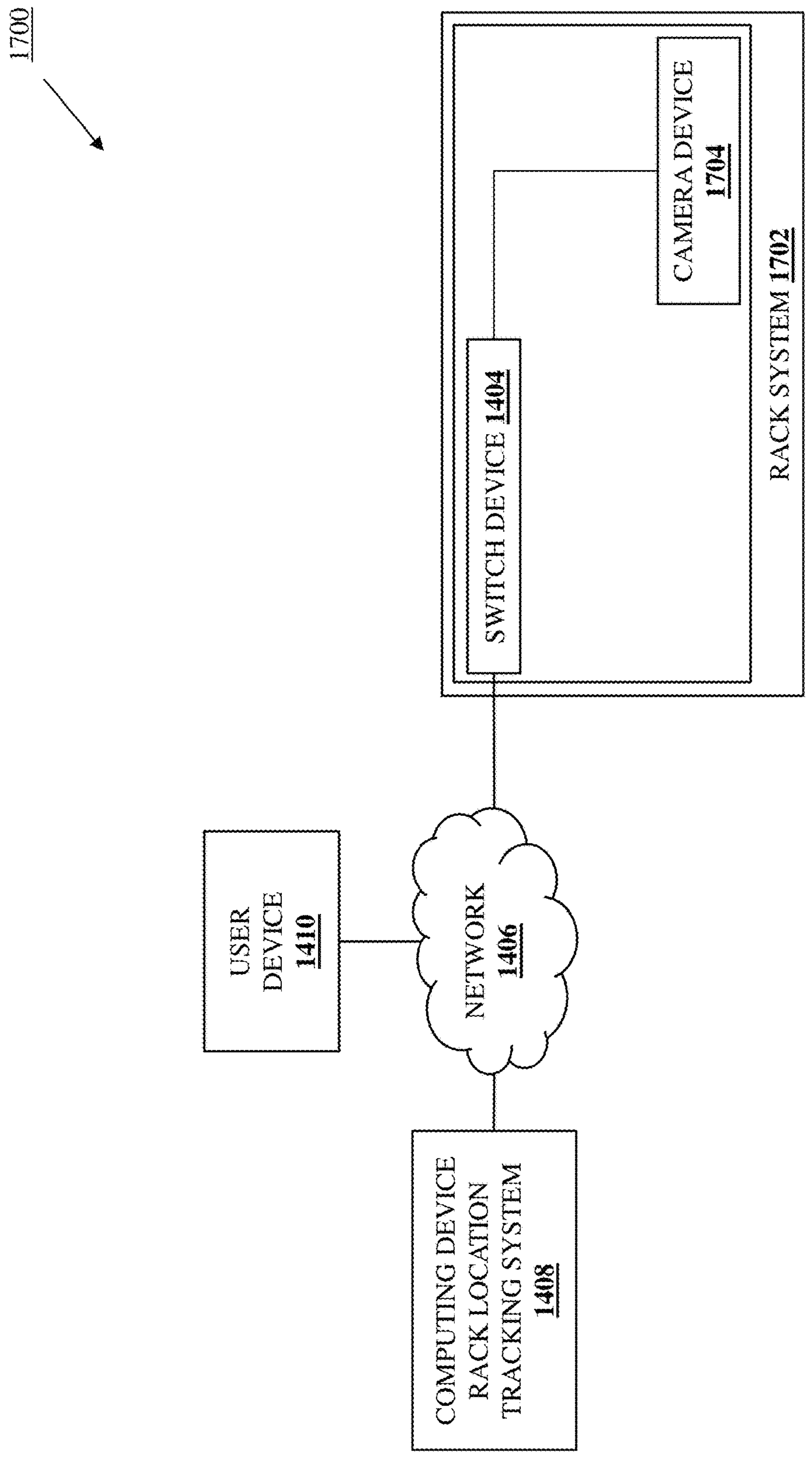
FIG. 17 is schematic view illustrating an embodiment of a networked system that may include the computing device rack location identification system of the present disclosure.

Similarly as described above, the computing device rack location identification system of the present disclosure may be provided in datacenters, server farms, and/or other locations where significant numbers of computing devices are utilized. With reference to FIG. 17, an embodiment of a networked system 1700 that may include the computing device rack location identification system of the present disclosure is illustrated that is similar to the networked system 1400 discussed above with reference to FIG. 14, and thus similar elements have been provided with the same element numbers. The networking system 1700 includes a rack system 1702 that may be provided by the rack system 800 discussed above with reference to FIGS. 8A, 8B, and 8C. A camera device 1704 is provided in the rack system 1702, and as will be appreciated by one of skill in the art in possession of the present disclosure, the camera device 1704 may be provided by any of the camera devices 808 discussed above with reference to FIGS. 8A, 8B and 8C.

As illustrated, the switch device 1404 may be positioned in any of the computing device housings 806 that are included in the rack system 800/1702 as described above with reference to FIGS. 8A, 8B and 8C, and may be coupled to the camera device 1704 (e.g., using wired couplings, wireless couplings and/or any of a variety of camera device/switch device coupling techniques that would be apparent to one of skill in the art in possession of the present disclosure) and the network 1406 that may be provided by a Local Area Network (LAN), the Internet, combinations thereof, and/or any other networks that would be apparent to one of skill in the art in possession of the present disclosure. The computing device rack location tracking system 1408 is coupled to the network 1406 and, as described below, may track the rack location of computing devices in rack systems like the rack system 1702 of FIG. 17.

The user device 1410 is coupled to the network 1406 and may be utilized to identify locations of computing devices in rack systems like the rack system 1702 of FIG. 17 via the computing device location tracking system 1408. However, while a specific example of a networked system 1700 that includes the computing devise rack location identification system of the present disclosure has been illustrated and described, one of skill in the art in possession of the present disclosure will appreciate how the computing device rack location identification system may be provided in a variety of manners while remaining within the scope of the present disclosure as well.

The method 1600 begins at block 1602 where a computing device that includes computing device identifier(s) is positioned in a computing device housing in a rack that includes a camera device adjacent each computing device housing. In the specific example below, the method 1600 is described using the computing device 1100 discussed above with reference to FIGS. 11A and 11B and the rack system 800 discussed above with reference to FIGS. 8A, 8B and 8C, but one of skill in the art in possession of the present disclosure will appreciate how the method 1600 will operate substantially similarly using the computing device 1200 of FIG. 12A.

Figure 18A:
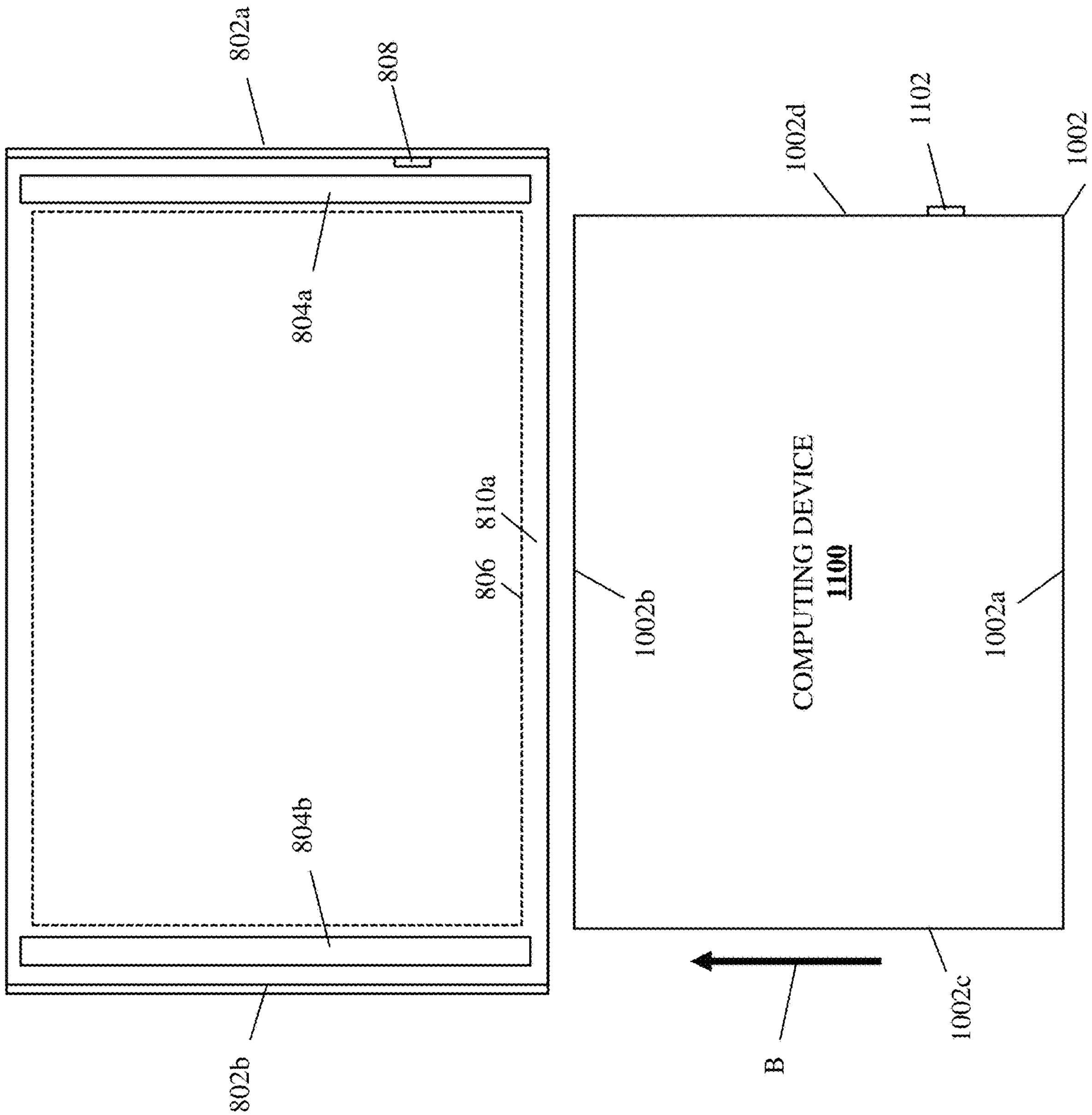
FIG. 18A is a schematic top view of the computing device of FIG. 11A being positioned in the rack system of FIGS. 8A and 8B during the method of FIG. 16.

As illustrated in FIG. 18A, in an embodiment of block 1602, the computing device 1100 may be positioned adjacent the rack entrance 810*a* such that the computing device 1100 is aligned with one of the computing device housings 806 on the rack system 800/1702, and the rear wall 1002*b* of the chassis 1002 on the computing device 1100 is located immediately adjacent that computing device housing 806. While not illustrated or described in detail, one of skill in the art in possession of the present disclosure will appreciate that the computing device mounting subsystems 804*a* and 804*b* may be extended from the retracted orientation illustrated in FIG. 18A and connected to the chassis 1002 of the computing device 1100. For example, at block 1602 the computing device 1100 may be connected to the second computing device mounting element 504 on the computing device mounting subsystem 500 discussed above with reference to FIGS. 5A and 5B such that the camera device 808 is located immediately adjacent one of the plurality of apertures 504*a*.

Figure 18B:
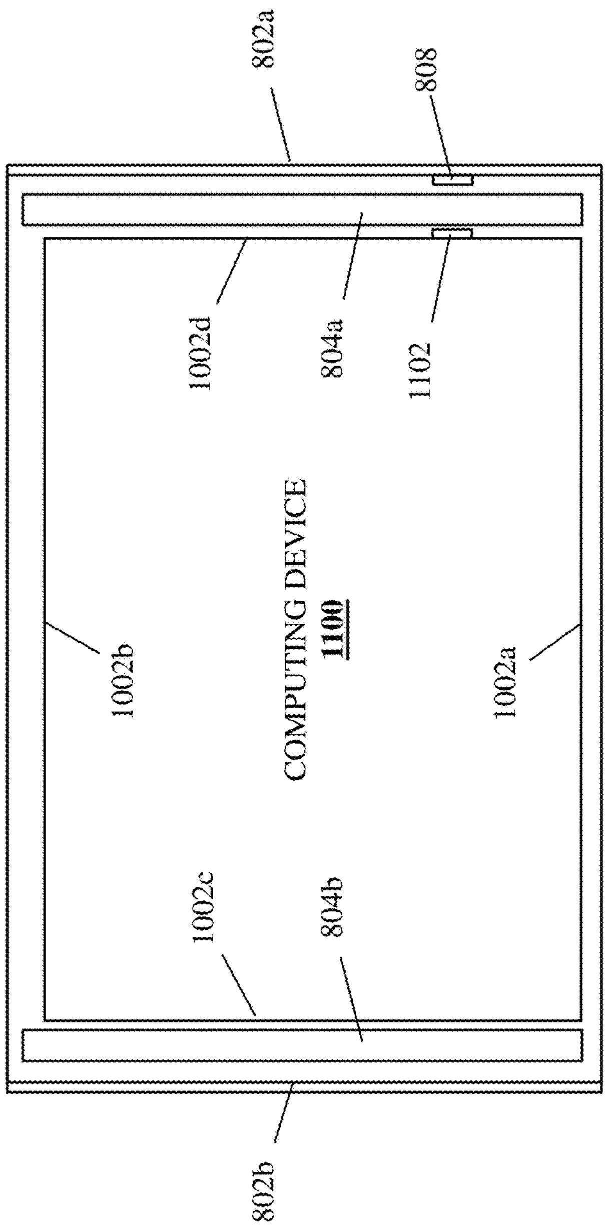
FIG. 18B is a schematic top view of the computing device of FIG. 11A positioned in the rack system of FIGS. 8A and 8B during the method of FIG. 16.

As illustrated in FIGS. 18A and 18B, the computing device 1100 may then be moved in a direction B (e.g., via the movement of the computing device mounting subsystems 804*a* and 804*b* into the retracted position illustrated in FIG. 18B) such that the computing device 1100 moves through the rack entrance 810*a* and into the computing device housing 806. As will be appreciated by one of skill in the art in possession of the present disclosure, the computing device 1100 may be considered to be "housed" in the computing device housing 806 when the chassis 1002 is entirely located in the computing device housing 806 as illustrated in FIG. 18B, and/or when the computing device mounting subsystems 804*a* and 804*b* are in the retracted orientation.

In the example illustrated in FIG. 18B, when the computing device 1100 is housed in the computing device housing 806, the camera device 808 located on the side wall 802*a* of the rack system 800/1702 may be configured to align with the computing device identifier 1102 located on the side wall 1002*d* of the computing device 1100. For example, at block 1602, the computing device mounting subsystem 500 may be provided in the retracted orientation discussed above with reference to FIG. 5B such that the camera device 808 on the side wall 802*a* of the rack system 800/1702 is located adjacent the aligned apertures 502*a* and 504*a* to provide the camera device 808 with a line of sight to the computing device identifier 1102. Furthermore, one of skill in the art in possession of the present disclosure will appreciate how the camera device 808 may be located on the side wall 802*b* of the rack system 800/1702 such that the camera device 808 may be configured to align with a computing device identifier located on the side wall 1002*c* of the computing device 1100 when the computing device 1100 is housed in the computing device housing 806 while remaining within the scope of the present disclosure as well.

However, while the specific example provided herein describes the camera device 808 aligning with the computing device identifier 1102 on the computing device 1100 when the computing device 1100 is housed in the computing device housing 806 in order to allow the camera device 808 to capture an image of that computing device identifier 1102 as described below, one of skill in the art in possession of the present disclosure will appreciate how the camera device 808 may be configured to capture an image of the computing device identifier 1102 as it moves past the camera device 808 on the rack system 800/1702 as the computing device 1100 is being housed in the computing device housing 806 while remaining within the scope of the present disclosure as well.

As discussed above, the computing device 1200 may be positioned in the rack system 800/1702 similarly as described above for the computing device 1100, and one of skill in the art in possession of the present disclosure will recognize that the camera device 808 may be configured to align with one of the plurality of computing device identifiers 1202 on the computing device 1200 when the computing device 1200 is housed in the computing device housing 806 in order to capture an image of any of the computing device identifiers 1202, or may be configured to capture an image of any of the plurality of computing device identifiers 1202 on the computing device 1200 as they move past the camera device 808 as the computing device 1200 is being housed in the computing device housing 806 while remaining within the scope of the present disclosure as well. However, while specific examples have been provided of positioning a computing device in a computing device housing of a rack system in the computing device rack location identification system of the present disclosure, one of skill in the art in possession of the present disclosure will appreciate how computing devices may be positioned in computing device housings in rack systems in a variety of manners while remaining within the scope of the present disclosure as well.

Figure 18C:
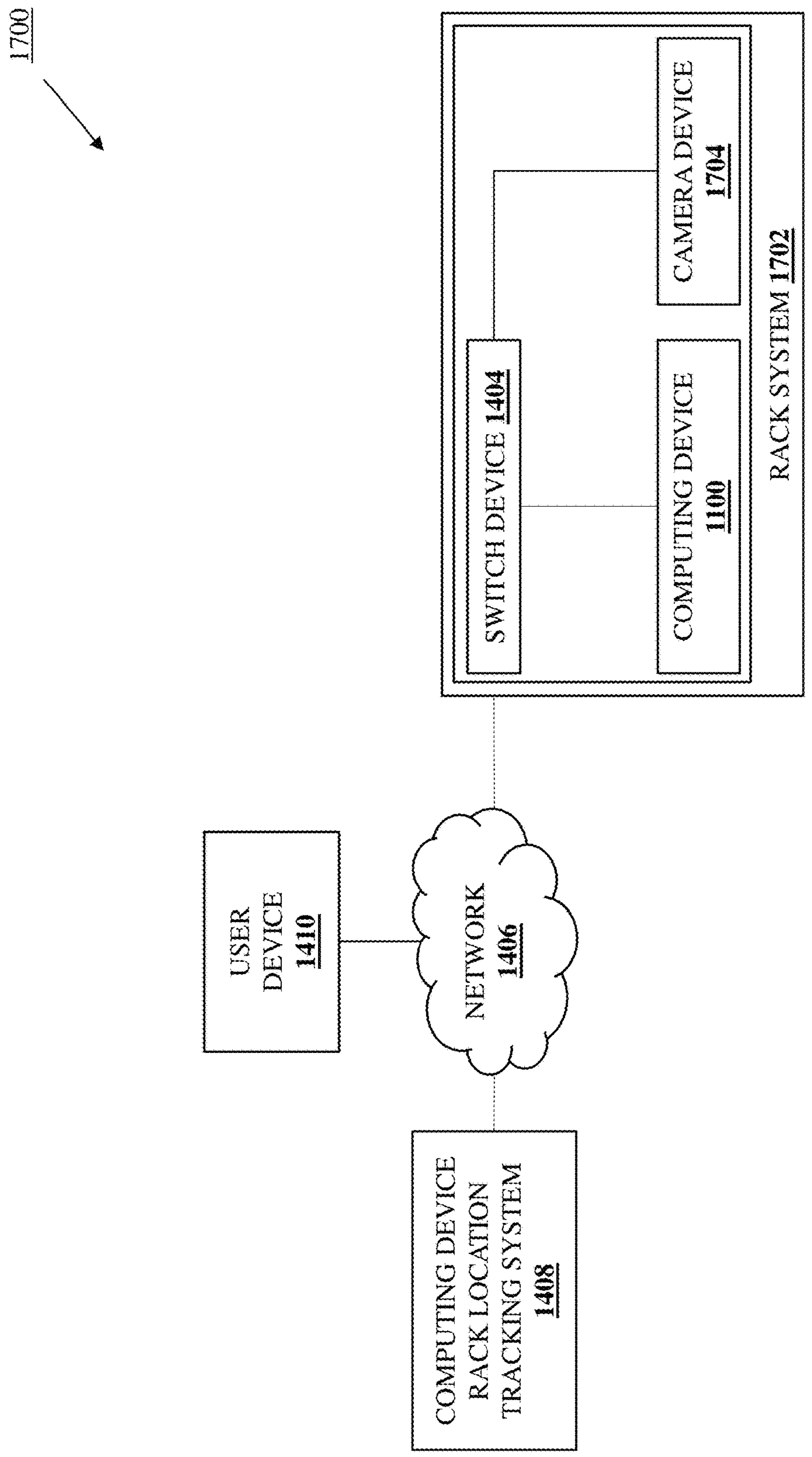
FIG. 18C is a schematic view of the computing device of FIGS. 11A and 11B provided in the networked system of FIG. 17 during the method of FIG. 16.
Figure 18D:
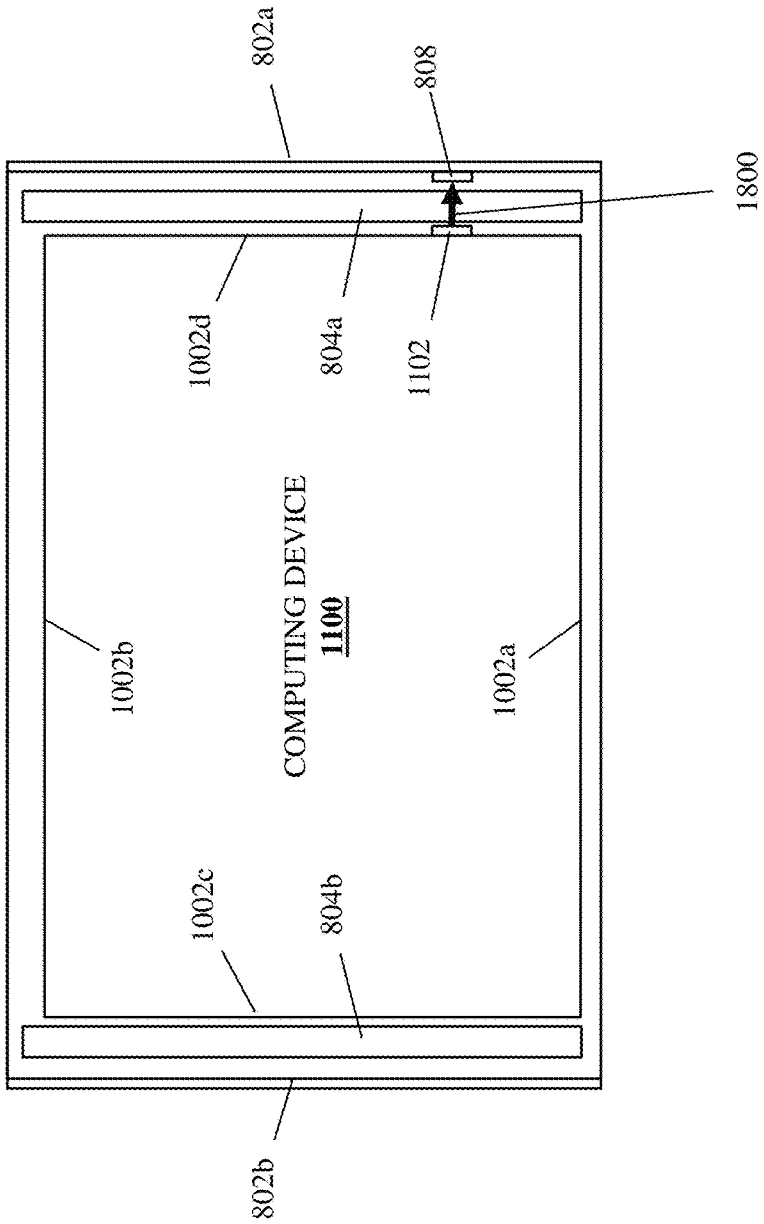
FIG. 18D is a schematic top view of the computing device of FIG. 11A positioned in the rack system of FIGS. 8A and 8B with a camera device on the rack system operating during the method of FIG. 16.

The method 1600 then proceeds to block 1604 where a camera device in a rack captures an image of the computing device identifier included on the computing device positioned in its computing device housing. With reference to FIGS. 18C and 18D, in an embodiment of block 1604, the camera device 808 in the rack system 800/1702 may perform image capture operations 1800 that may include the camera device 808 capturing an image of the computing device identifier 1102 once the camera device 808 is aligned with that computing device identifier 1102, or as that computing device identifier 1102 moves past the camera device 808 included in the rack system 800/1702. Similarly as described above, one of skill in the art in possession of the present disclosure will appreciate how the camera device 808 may be located on the side wall 802*b* of the rack system 800/1702 and may be used to capture an image of a computing device identifier located on the side wall 1002*c* of the computing device 1100 in a similar manner as well.

Furthermore, one of skill in the art in possession of the present disclosure will recognize how the camera device 808 may be used to capture an image of one of the plurality of computing device identifiers 1202 on the computing device 1200 once the camera device 808 is aligned with one of the plurality of computing device identifiers 1202, or as one of the plurality of computing device identifiers moves past the camera device 808 as well. However, while specific examples of the capturing of an image of computing device identifiers have been described, one of skill in the art in possession of the present disclosure will appreciate how images of computing device identifiers may be captured in a variety of manners while remaining with the scope of the present disclosure as well.

The method 1600 then proceeds to block 1606 where a computing device rack location reporting subsystem receives an image of the computing device identifier captured by the camera device. In the illustrated example, the camera device 1704 may include a processing system and a memory system that includes instructions that, when executed by the processing system, cause the processing system to provide a computing device rack location reporting engine that is configured to perform the functionality of the computing device rack location reporting engines, computing device rack location reporting subsystems, and/or camera devices discussed below.

However, one of skill in the art in possession of the present disclosure will appreciate how the computing device rack location reporting subsystem may be separate from and coupled to the camera device 1704, and may be provided by any of the computing devices included in the rack system 1702, the switch device 1404, a device included in the rack system 1702 that is separate from the camera device 1704, the computing devices in the rack system 1702, and the switch device 1404, and/or any other computing device rack location reporting subsystem that would be apparent to one of skill in the art in possession of the present disclosure. As such, one of skill in the art in possession of the present disclosure will appreciate how the functionality of the computing device rack location reporting subsystem described below may be provided in a variety of manners that will fall within the scope of the present disclosure as well.

In some examples, following the capturing of the image data by the camera device 808, the computing device rack location reporting subsystem provided by the camera device 1704 may decode the information contained in the image data for the computing device identifier 1102 (e.g., information encoded in the QR code, UPC code, etc.) in order to retrieve image information associated with the image of the computing device identifier 1102, which as discussed above may include a computing device identifier for the computing device 1100 (e.g., "service tag", serial number, or other computing device identifier known in the art).

Figure 18E:
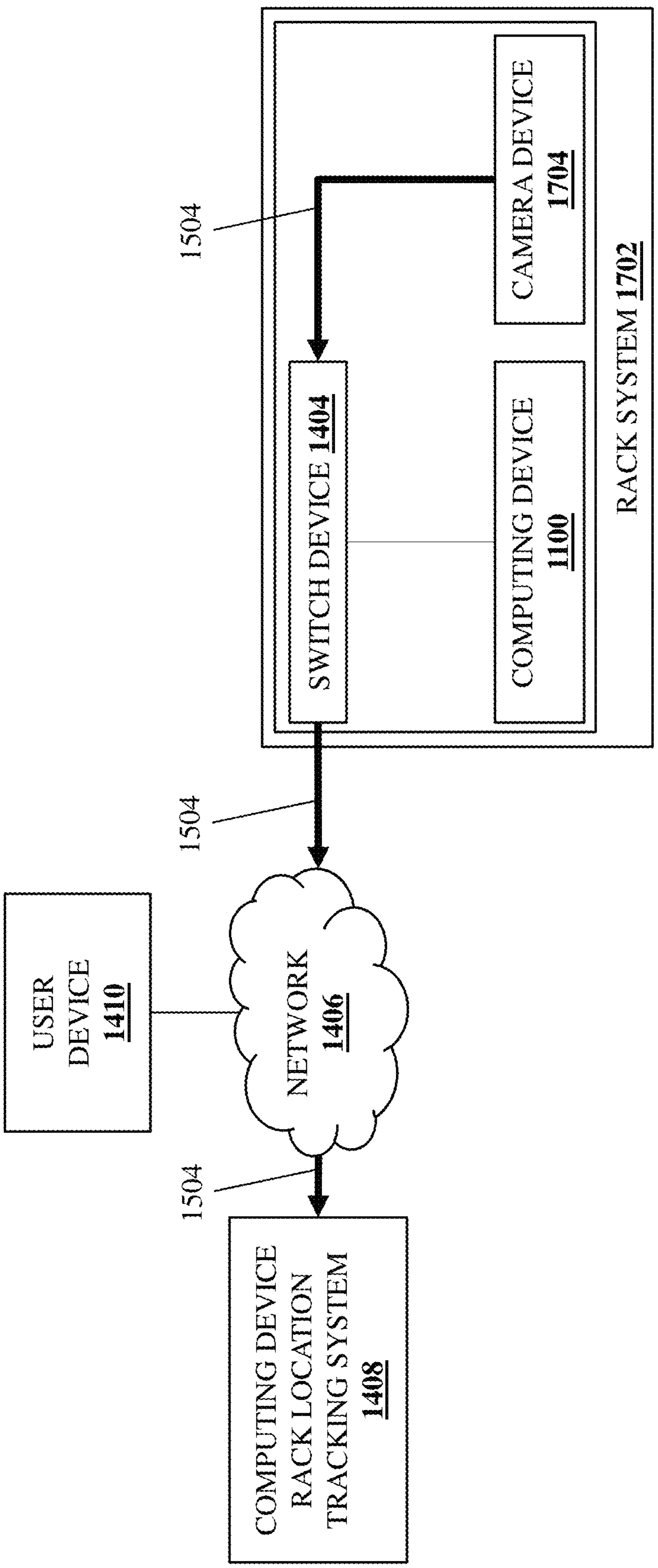
FIG. 18E is a schematic view of the networked system of FIG. 18C operating during the method of FIG. 16.

The method 1600 then proceeds to block 1608 where the computing device rack location reporting subsystem transmits rack location information and image information associated with the image to a computing device rack location tracking subsystem. With reference to FIG. 18E, in an embodiment of block 1608, the computing device rack location reporting subsystem provided by the camera device 1704 may perform rack location information and image information transmission operations 1504 that may include transmitting rack location information and the image information associated with the image via the switch device 1404 and the network 1406 to the computing device rack location tracking system 1408.

In an embodiment, the rack location information transmitted at block 1608 as described above may include any information that may be used to identify the rack location provided by the computing housing 806 to which the camera device 1704 is adjacent. For example, the rack location information may include explicit identifiers identifying the computing device 1100; the datacenter, rack system 800/1702, and computing device housing 806 in which the computing device 1100 is located; and/or any other explicit computing device location information that would be apparent to one of skill in the art in possession of the present disclosure. In another example, the rack location information may include unique camera identification information about the camera device 1704 (e.g., a camera "service tag", a camera serial number, and/or other unique camera identification information) that may be associated in a database with the datacenter, rack system 800/1702, and computing device housing 806 in which the camera device 1704 is located. As such one of skill in the art in possession of the present disclosure will appreciate how the rack location for the camera device 1704 may be identified in a variety of manners that will fall within the scope of the present disclosure as well.

In response to receiving the rack location information that is provided by the unique camera identification information, the computing device rack location tracking system 1408 may access the database discussed above and use that unique camera identification information to identify explicit rack location information provided by the associated datacenter, rack system 800/1702, and computing device housing 806 in which the camera device 1704 is located. The computing device rack location tracking system 1408 may then store the explicit rack location information and image information in the computing device rack location tracking database that is accessible to the computing device rack location tracking system 1408. For example, in embodiments in which the computing device rack location reporting system decoded the image data captured of the computing device identifier 1102 to provide the image information and transmitted that image information to the computing device rack location tracking system 1408, the computing device rack location tracking system 1408 may store that image information in the computing device rack location tracking database along with the explicit rack location identification information as a location of the computing device 1100 (e.g., as an entry in the computing device rack location tracking database identifying the computing device 1100, the datacenter, rack system 800/1702, and computing device housing 806 in which the computing device 1100 is located, as well as any other computing device information that would be apparent to one of skill in the art in possession of the present disclosure).

In another example, the embodiments in which the computing device rack location tracking system 1408 receives the image data captured of the computing device identifier 1102 by the camera device 808 as the image information, the computing device rack location tracking system 1408 may decode that image data similarly as the camera device 1704 or the camera device 808 discussed above, and store the result in the computing device rack location tracking database along with the explicit rack location identification information as a location of the computing device 1100 (e.g., as an entry in the computing device rack location tracking database identifying the computing device 1100, the datacenter, rack system 800/1702, and computing device housing 806 in which the computing device 1100 is located, as well as any other computing device information that would be apparent to one of skill in the art in possession of the present disclosure).

Figure 18F:
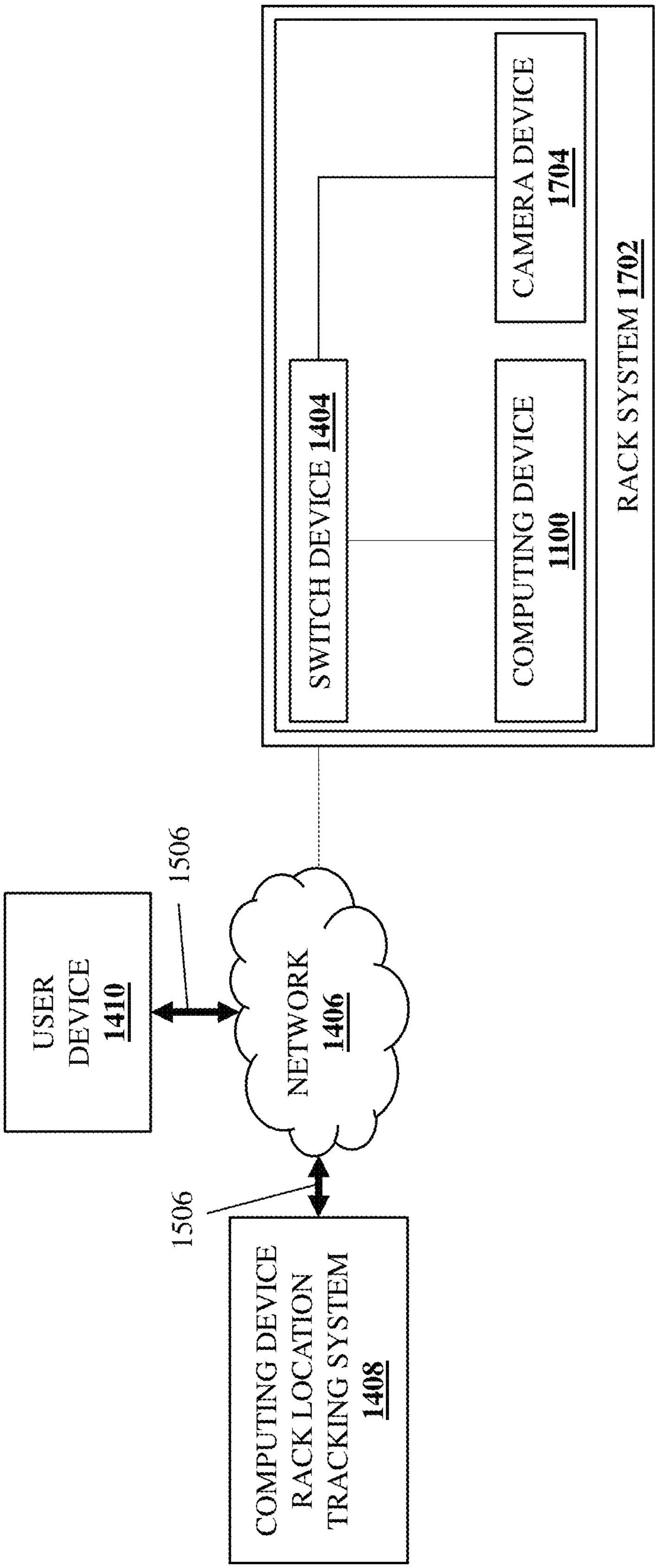
FIG. 18F is a schematic view of the networked system of FIG. 18C operating during the method of FIG. 16.

As such, one of skill in the art in possession of the present disclosure will appreciate how the computing device rack location tracking system 1408 may populate the computing device rack location tracking database with entries identifying the locations of a plurality of computing devices similarly as described above for the computing device 1100. Furthermore, any user wishing to identify the location of any of those computing devices may request that location from the computing device rack location tracking system 1408. For example, with reference to FIG. 18F, the user device 1410 and the computing device rack location tracking system 1408 may perform computing device rack location identification operations 1506 that may include the user device 1410 requesting the location of a computing device from the computing device rack location tracking system 1408 (e.g., by identifying that computing device using a "service tag", serial number, or other computing device identifier known in the art), the computing device rack location tracking system 1408 identifying the location of that computing device (e.g., by using the computing device identifier to identify the entry in the computing device rack location tracking database for that computing device and identifying the datacenter, the rack system, and computing device housing in which that computing device is located), and the computing device rack location tracking system 1408 transmitting the location of that computing device to the user device 1410 for display. As such, the user of the user device 1410 may retrieve the location of any computing device whose location is tracked in the computing device rack location tracking system 1408.

In some embodiment, the computing device rack location tracking system 1408 may be configured to identify when computing devices have been removed from a rack system or moved between rack systems. For example, in some embodiments, the camera devices described above may be configured to periodically attempt to capture the rack location identifier or computing device identifier located adjacent to them, and thus the inability by a camera device to capture the adjacent rack location identifier or computing device identifier may provide an indication to the computing device rack location tracking system 1408 that an associated computing device has been removed from its rack system, and may result in the computing device rack location tracking system 1408 generating a computing device rack removal warning or other communication. In another example, in some embodiments, the receipt by the computing device rack location tracking system 1408 of "new" rack location information for a computing device that conflicts with "old" rack location information for a computing device may indicate to the computing device rack location tracking system 1408 that that computing device has been moved between rack systems, and may cause the computing device rack location tracking system 1408 to delete the "old" rack location information for that computing device and in some cases generate a computing device rack movement warning or other communication.

Thus, systems and methods have been described that provide for the determination of the location of a computing device in a rack system. For example, the computing device location identification system of the present disclosure may include a rack system defining computing device housings and that includes at least one camera device located adjacent each computing device housing. A computing device that includes a computing device identifier may be positioned in any of the computing device housings, and a camera device located adjacent that computing device housing in the rack may capture an image of that computing device identifier A computing device rack location reporting subsystem included in the rack system receives the image captured by the camera device, and transmits image information associated with the image via a network to a computing device rack location tracking system. As such, the imprecise tracking of computing devices in conventional computing device location identification systems that often requires manual identification of computing devices is eliminated.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A computing device rack location identification system, comprising:

a rack system that defines a plurality of computing device housings and that includes at least one respective rack location identifier located adjacent each of the plurality of computing device housings;

a respective rack mounting subsystem mounted to the rack system adjacent each of the plurality of computing device housings, wherein each respective rack mounting subsystem adjacent a computing device housing is configured to provide an aperture through which the at least one respective rack location identifier located adjacent that computing device housing is visible when that respective rack mounting subsystem is provided in a retracted orientation; and a computing device that is configured to be mounted to any of the respective rack mounting subsystems to allow the computing device to be positioned in the computing device housing adjacent that respective rack mounting subsystem, wherein the computing device includes:

a chassis;

a camera device that is included in the chassis and configured, when the computing device is mounted to any of the respective rack mounting subsystems and positioned in the computing device housings adjacent that respective rack mounting subsystem via that respective rack mounting subsystem being provided in the retracted orientation, to capture an image of the at least one respective rack location identifier that is located adjacent that computing device housing through the aperture provided by that respective rack mounting subsystem in the retracted orientation; and a computing device rack location reporting subsystem that is included in the chassis, that is coupled to the camera device, and that is configured to:

receive, from the camera device when the computing device is mounted to a first rack mounting subsystem and positioned in the rack system in a first computing device housing included in the plurality of computing device housings via the first rack mounting subsystem being provided in the retracted orientation, a first image captured by the camera device of a first rack location identifier that is located adjacent the first computing device housing through the aperture provided by the first rack mounting subsystem in the retracted orientation; and transmit first image information associated with the first image via a network to a computing device rack location tracking system.

2. The system of claim 1, wherein the rack system includes a single respective rack location identifier located adjacent each of the plurality of computing device housings, and wherein the camera device is included on the chassis such that the camera device is located immediately adjacent the first rack location identifier that is located adjacent the first computing device housing when the chassis is positioned in the first computing device housing.

3. The system of claim 1, wherein the rack system includes a plurality of adjacent rack location identifiers located adjacent each respective computing device housing, and wherein the camera device is included on the chassis such that the camera device is located immediately adjacent the first rack location identifier included in a first plurality of adjacent rack location identifiers that are located adjacent the first computing device housing when the chassis is positioned in the first computing device housing.

4. The system of claim 1, wherein each respective rack mounting subsystem adjacent a computing device housing includes a plurality of rack mounting subsystem components that each include a respective first aperture and that are moveable relative to each other into the retracted orientation to align the respective first apertures to provide a second aperture through which the at least one respective rack location identifier located adjacent that computing device housing is visible when that respective rack mounting subsystem is provided in the retracted orientation.

5. The system of claim 1, wherein each respective rack mounting subsystem is configured to move between the retracted orientation and an extended orientation.

6. The system of claim 1, wherein the at least one respective rack location identifier located adjacent each of the plurality of computing device housing includes information identifying the rack system and that computing device housing.

7. The system of claim 1, wherein the computing device rack location reporting subsystem is configured to:

receive, from the camera device when the computing device is mounted to a second rack mounting subsystem and positioned in the rack system in a second computing device housing included in the plurality of computing device housings via the second rack mounting subsystem being provided in the retracted orientation, a second image captured by the camera device of a second rack location identifier that is located adjacent the second computing device housing through the aperture provided by the second rack mounting subsystem in the retracted orientation; and transmit second image information associated with the second image via the network to the computing device rack location tracking system.

8. A rack system, comprising:

a rack chassis defining a plurality of plurality of computing device housings;

at least one respective rack location identifier located adjacent each of the plurality of computing device housings;

a respective rack mounting subsystem mounted to the rack system adjacent each of the plurality of computing device housings, wherein each respective rack mounting subsystem adjacent a computing device housing is configured to:

couple to and support a computing device when that respective rack mounting subsystem is provided in an extended orientation;

move from the extended orientation to a retracted orientation to position the computing device coupled to and supported by that respective rack mounting subsystem in that computing device housing; and provide, in response to moving from the extended orientation to the retracted orientation, an aperture through which an image may be captured of the at least one respective rack location identifier located adjacent that computing device housing by a camera in the computing device coupled to and supported by that respective rack mounting subsystem.

9. The IHS of claim 8, wherein a single respective rack location identifier is located adjacent each of the plurality of computing device housings, and wherein each respective rack mounting subsystem adjacent a computing device housing is configured to move from the extended orientation to the retracted orientation to position the computing device coupled to and supported by that respective rack mounting subsystem in that computing device housing such that the camera device in that computing device is located immediately adjacent the single respective rack location identifier that is located adjacent that computing device housing.

10. The IHS of claim 8, wherein a plurality of adjacent rack location identifiers are located adjacent each respective computing device housing, and wherein each respective rack mounting subsystem adjacent a computing device housing is configured to move from the extended orientation to the retracted orientation to position the computing device coupled to and supported by that respective rack mounting subsystem in that computing device housing such that the camera device is located immediately adjacent one of the plurality of adjacent rack location identifiers that are located adjacent the that computing housing.

11. The IHS of claim 8, wherein each respective rack mounting subsystem adjacent a computing device housing includes a plurality of rack mounting subsystem components that each include a respective first aperture and that are moveable relative to each other into the retracted orientation to align the respective first apertures to provide a second aperture through which an image may be captured of the at least one respective rack location identifier located adjacent that computing device housing by a camera in the computing device coupled to and supported by that respective rack mounting subsystem.

12. The IHS of claim 8, wherein the at least one respective rack location identifier located adjacent each of the plurality of computing device housings includes information identifying the rack system.

13. The IHS of claim 8, wherein the at least one respective rack location identifier located adjacent each of the plurality of computing device housings includes information identifying that computing device housing.

14. A method for identifying a rack location of a computing device in a rack system, comprising:

mounting, by a computing device, to a first rack mounting subsystem that is mounted to a rack system adjacent a first computing device housing included in a plurality of computing device housings defined by the rack system, wherein the rack system includes at least one respective rack location identifier located adjacent each of the plurality of computing device housings;

positioning, by the computing device via movement of the first rack mounting subsystem into a retracted orientation, in the first computing device housing;

providing, by the first rack mounting subsystem in response to movement of the first rack mounting subsystem into the retracted orientation, a first aperture through which the at least one respective rack location identifier located adjacent the first computing device housing is visible;

capturing, by a camera device included in the computing device through the first aperture, a first image of the at least one respective rack location identifier located adjacent the first computing device housing;

receiving, by a computing device rack location reporting subsystem included in the computing device, the first image captured by the camera device of the at least one respective rack location identifier located adjacent the first computing device housing; and transmitting, by the computing device rack location reporting subsystem, first image information associated with the first image via a network to a computing device rack location tracking subsystem.

15. The method of claim 14, wherein the rack system includes a single respective rack location identifier located adjacent each of the plurality of computing device housings, and wherein the camera device is included in the computing device such that the camera device is located immediately adjacent the first rack location identifier that is located adjacent the first computing device housing when the computing device is positioned in the first computing device housing.

16. The method of claim 14, wherein the rack system includes a plurality of adjacent rack location identifiers located adjacent each respective computing device housing, and wherein the camera device is included in the computing device such that the camera device is located immediately adjacent the first rack location identifier included in a first plurality of adjacent rack location identifiers that are located adjacent the first computing device housing when the computing device is positioned in the first computing device housing.

17. The method of claim 14, further comprising:

moving, by a plurality of rack mounting subsystem components on the first rack mounting subsystem that each include a respective second aperture, relative to each other into the retracted orientation; and aligning, by the plurality of rack mounting subsystem components, the respective second apertures to provide the first aperture through which the at least one respective rack location identifier located adjacent the first computing device housing is visible.

18. The method of claim 14, wherein each respective rack mounting subsystem is configured to move between the retracted orientation and an extended orientation.

19. The method of claim 14, wherein the at least one respective rack location identifier located adjacent each of the plurality of computing device housings includes information identifying the rack system and that computing device housing.

20. The method of claim 14, further comprising:

mounting, by the computing device, to a second rack mounting subsystem that is mounted to the rack system adjacent a second computing device housing included in the plurality of computing device housings defined by the rack system;

positioning, by the computing device via movement of the second rack mounting subsystem into the retracted orientation, in the second computing device housing;

providing, by the second rack mounting subsystem in response to movement of the second rack mounting subsystem into the retracted orientation, a second aperture through which the at least one respective rack location identifier located adjacent the second computing device housing is visible;

capturing, by the camera device included in the computing device through the second aperture, a second image of the at least one respective rack location identifier located adjacent the second computing device housing;

receiving, by the computing device rack location reporting subsystem, the second image captured by the camera device of the at least one respective rack location identifier located adjacent the second computing device housing; and transmitting, by the computing device rack location reporting subsystem, second image information associated with the second image via the network to a computing device rack location tracking system.

* * * * *